Dec. 25, 1962 C. H. CURREY ET AL 3,070,798

SYSTEM FOR DETERMINING THE LISTENING HABITS OF WAVE SIGNAL RECEIVER USERS

Filed June 9, 1958 14 Sheets-Sheet 1

INVENTORS
CHARLES H. CURREY,
A.C. LEWIS BROWN,
DARREL W. HOLBROOK,
GORDON K. TRUESDALE AND
ROBERT L. FREEMAN

BY *Mason, Kolehmainen, Rathburn & Wyss,*
ATTORNEYS

RECEIVER ATTACHMENT-21

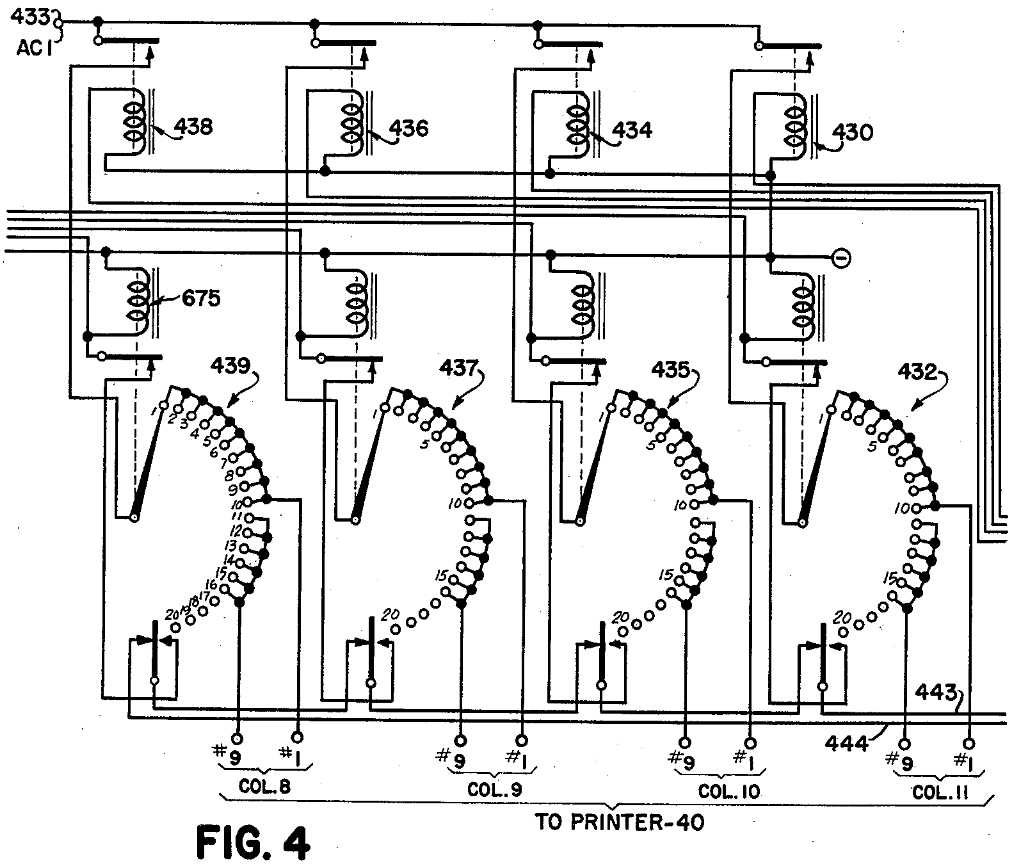
FIG. 4
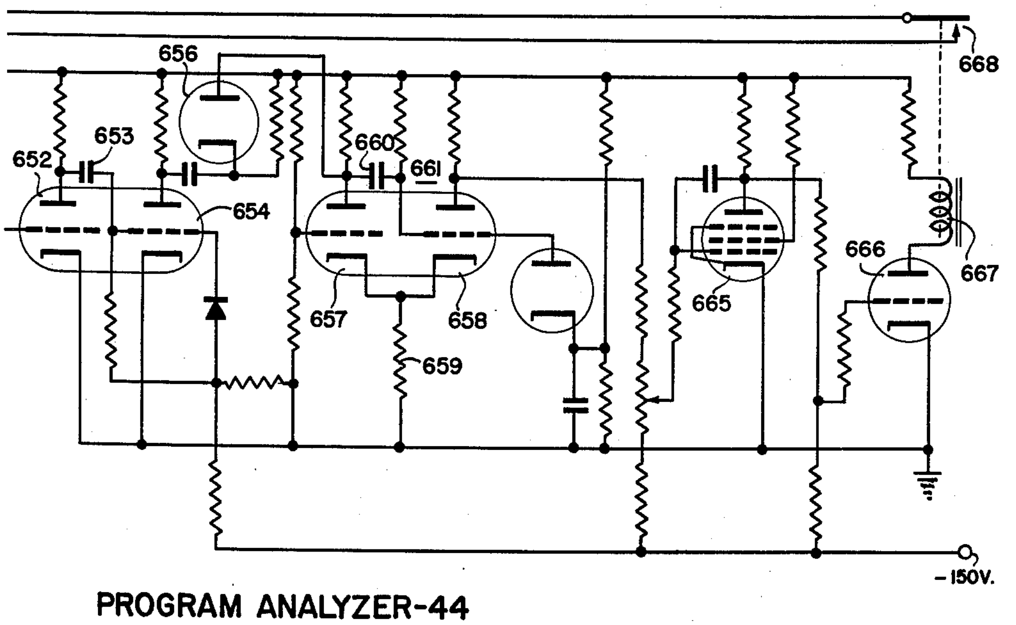
PROGRAM ANALYZER-44

Dec. 25, 1962 C. H. CURREY ET AL 3,070,798

SYSTEM FOR DETERMINING THE LISTENING HABITS OF WAVE SIGNAL RECEIVER USERS

Filed June 9, 1958 14 Sheets-Sheet 8

Dec. 25, 1962 C. H. CURREY ET AL 3,070,798

SYSTEM FOR DETERMINING THE LISTENING HABITS OF WAVE SIGNAL RECEIVER USERS

Filed June 9, 1958 14 Sheets-Sheet 9

Dec. 25, 1962 C. H. CURREY ET AL 3,070,798

SYSTEM FOR DETERMINING THE LISTENING HABITS OF WAVE SIGNAL RECEIVER USERS

Filed June 9, 1958 14 Sheets-Sheet 10

Dec. 25, 1962 C. H. CURREY ET AL 3,070,798
SYSTEM FOR DETERMINING THE LISTENING HABITS
OF WAVE SIGNAL RECEIVER USERS
Filed June 9, 1958 14 Sheets-Sheet 12

Dec. 25, 1962 C. H. CURREY ET AL 3,070,798

SYSTEM FOR DETERMINING THE LISTENING HABITS OF WAVE SIGNAL RECEIVER USERS

Filed June 9, 1958 14 Sheets-Sheet 13

United States Patent Office 3,070,798

Patented Dec. 25, 1962

3,070,798

SYSTEM FOR DETERMINING THE LISTENING HABITS OF WAVE SIGNAL RECEIVER USERS

Charles H. Currey, Palatine, Arthur Charles Lewis Brown, Evanston, Darrel W. Holbrook, Glenview, Gordon K. Truesdale, Morton Grove, and Robert L. Freeman, Glenview, Ill., assignors to A. C. Nielsen Company, Chicago, Ill., a corporation of Delaware Filed June 9, 1958, Ser. No. 740,639
19 Claims. (Cl. 346—37)

The present invention relates to wave signal receiver monitoring systems, and more particularly to an improved system for monitoring, from a remote location, a plurality of wave signal receivers to determine the extent of use of each receiver and, moreover, to determine the particular source from which program signals are received and translated by each receiver. In particular, therefore, the improved system of the present invention is well adapted for use in ascertaining the listening or viewing habits of wave signal receiver users.

Generally speaking, the effectiveness of a particular program as an advertising media is directly related to the average size of the listening audience, the average period of listening to the program, i.e., the "holding power" of the program, and the variations in the size of the listening audience on a periodic basis. The periodic variations in the audience are indicative of the program components which cause audience gains or losses, the type of commercial messages which cause audience losses, and the optimum location of commercial messages during the program. In addition, it is desirable, in order to determine the effectiveness of a program as an advertising media, to obtain the following information or "ratings":

(1) *Cumulative audience.*—The total number of different homes listening to one or more of four successive broadcasts of a weekly program.
(2) *Program duplication.*—The extent to which programs of the same sponsor reach different audiences.
(3) *Audience flow.*—The proportion of a programmed audience which was gained from people initially turning on or re-tuning their receivers from specified other programs.
(4) *Program audience by market positions.*—A tabulation of the audience of specified programs in accordance with census groupings, such as, for example, geographic locations, family income, religion, etc.

Unless a very large staff or particularly complex and expensive calculating equipment is employed, considerable time is required to compute the above four ratings, and at best, approximately one week of monitoring is necessary. However, it is sometimes desirable to know the effectiveness of a particular program, or parts thereof, within a very short time after the termination of that program, and therefore, certain other information or ratings, while less detailed than the above factors, are both useful and necessary. These latter types of analytical information are generally known in the art as "fast ratings" and are usually expressed as percentages. These ratings for television monitoring, for example, are three in number and are as follows:

(1) Number of homes using TV.
(2) Average audience for a particular program.
(3) Share of audience for a particular program.

The first attempts to monitor home receivers utilized the so-called "telephone call method" which involves the making of hundreds of personal telephone calls to randomly selected homes during the period when a particular program of interest is in process and statistically analyzing the results of these telephone calls to determine the extent of listening. Although the information obtained by such a method is better than no information at all and can be used to compute the "fast ratings," because of the many inherent defects of this method, which defects include the uncontrolled uncertainties which are introduced by human judgement, the accuracy of the results so obtained tends to be destroyed. In fact, it is entirely impossible to obtain any useful information concerning most of the factors given above when the telephone-call method of monitoring is used.

Because both the networks and the sponsors of radio and television programs are desirous of obtaining accurate information as to the relative effectiveness of the programs with which they are associated, more accurate instrumented methods of sampling which do not require active audience collaboration have been necessarily resorted to so as to provide more information than is accumulated by the telephone-call sampling technique and, moreover, entirely to eliminate errors of human judgment associated with the personal contact types of sampling methods.

The instrumented methods or systems for monitoring receivers are in general of two types: the first utilizes a plurality of recorders, respectively located at a plurality of receivers to be monitored, and the second utilizes a single recorder remotely located with respect to the receivers to be monitored and to which information is automatically transmitted, either periodically or continuously, from each monitored receiver. The latter type system best lends itself to producing fast ratings which may be made available a short time after the termination of a program, and the present invention is concerned with such a system.

Network programs are ordinarily transmitted from network affiliated stations, but at certain times these affiliated stations replace the network programs with programs of purely local interest. Since the networks and sponsors of network programs are particularly desirous of knowing the extent of listening to network programs, it is necessary that the monitoring system compensate for changes in programming by the network affiliated stations so as to maintain the accuracy of the network program ratings. Moreover, for purposes of reliability and economy it is desirable that the system operate without manual attention, and therefore, the system should preferably include means for automatically determining when the network affiliated stations are not transmitting network programs.

In order to compute with the necessary degree of accuracy the above described factors and ratings from data collected from a group of homes comprising a sample, it is important to know how many active homes are in the sample, i.e., how many homes have monitoring equipment which is operative at the time of the survey. The number of active homes in the sample comprises what is known in the art as the "base count," and it is preferable in a continuous monitoring system of the type to which the present invention is directed to check, at least once each day, the monitoring equipment in each home to provide an accuate "base count" for each day.

A principal object of the present invention is to provide a new and improved method and apparatus for ascertaining the listening habits of wave signal receiver users.

Another object of the present invention is to provide a new and improved method and apparatus for monitoring the use of wave signal receivers.

A further object of the present invention is to provide a new and improved monitoring system in which information is conveyed from a plurality of individual wave signal receivers to a central office wherein this information is periodically scanned and accumulated to automatically provide the fast ratings described above.

Another object of the present invention is to provide a wave signal receiver monitoring system including means for determining when network programs are being transmitted by network affiliated stations.

Another object of the present invention is to provide a wave signal receiver monitoring system which provides accurate fast ratings for network programs.

Another object of the present invention is to provide means for periodically checking the monitoring equipment of each home in the sample.

Another object of the present invention is to provide a monitoring system for a plurality of receivers comprising a sample, and which includes means for providing an accurate indication of the base count of the sample.

Briefly, the above and further objects are realized by providing a monitoring system including a plurality of receiver attachments respectively associated with receivers to be monitored; scanning, accumulating and tabulating equipment located at a central office; and signal links connecting the reeciver attachments to the equipment at the central office. In a preferred embodiment of the invention, the central office is also connected to sources of the network programs which are ordinarily transmitted by some or all of the local stations, and comparison means is provided at the central office for comparing the network programs with those programs actually receivable in the area, thereby to automatically determine whether the local transmitting stations are carrying network programs. The illustrated system embodying the present invention further includes means for periodically checking the operation of the receiver attachments and for providing a record of the number of such attachments which are operating properly.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings, in which:

FIGS. 3–12 are portions of a schematic circuit diagram of the central office equipment used in the system of the present invention;

FIG. 13 is a diagram showing the manner in which FIGS. 3–12 are interconnected;

Figure 1:
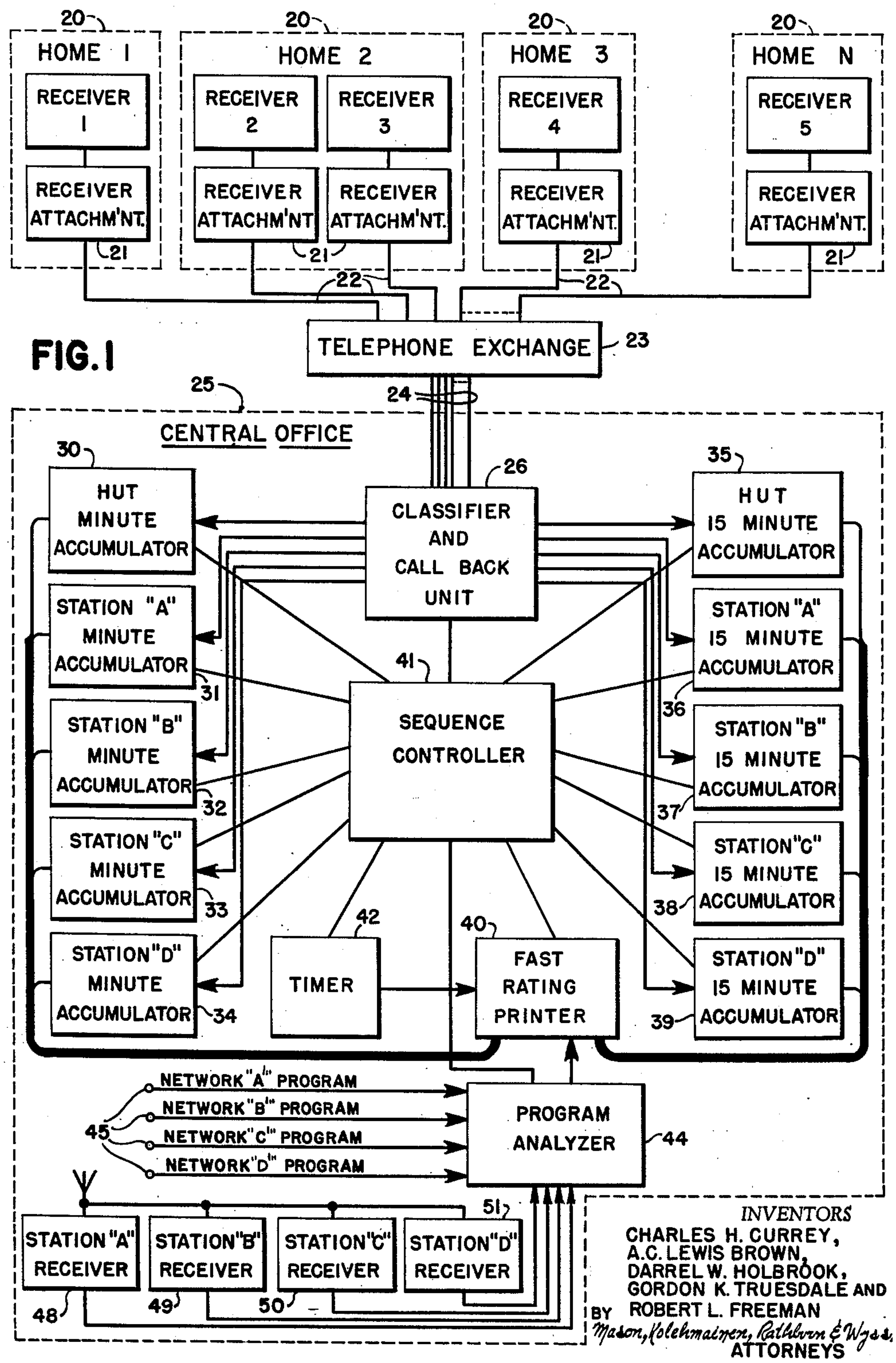
FIG. 1 is a schematic illustration, in block diagram form, of a monitoring system embodying the present invention.

Referring now to the drawings, and particularly to FIG. 1 thereof, there is shown in block diagram form a wave signal receiver monitoring system embodying the present invention. This system provides up-to-the-minute "fast ratings" for four of the stations or programs receivable by the receivers connected in the system. In addition, this system provides fifteen-minute averages for each of the monitored programs to facilitate the rapid use of the fast ratings by the subscribers of the monitoring service, and it will be understood that the totals for other time periods, such, for example, as for five-minute periods or for any multiple thereof could be readily provided in accordance with the teachings of this invention. In order to facilitate an understanding of the present invention, it is described in connection with the monitoring of television receivers, but it will be understood that it is equally suited for monitoring the use of broadcast receivers, FM receivers, and the like.

In the system shown in FIG. 1, a plurality of receiver attachments 21 are respectively connected to the receivers in a plurality of homes 20, which have been selected in accordance with well-known techniques to provide a sample which is representative of all of the homes in the particular area being monitored. Each of the receiver attachments 21 is electrically connected to a respective one of a plurality of telephone line pairs 22. Preferably, the lines 22 are of the leased type and continuously connect the receiver attachments 21 through a telephone exchange 23 and respective ones of a plurality of telephone line pairs 24 to the central office 25. Inasmuch as many homes have more than one television receiver, certain ones of the homes in the sample will necessarily have more than one receiver. Accordingly, and as shown for purposes of illustration, the home No. 2 includes two such receivers, each of which has associated therewith a respective one of the receiver attachments 21 and separate ones of the telephone line pairs 22. There is thus provided in the system of the present invention one receiver attachment and one telephone connection to the central office 25 for each receiver in the sample irrespective of the number of receivers which may be located in any one home.

The receiver attachments 21 may be of any suitable type which provides an electrical output signal having a variable characteristic indicative of the operating condition of the associated receiver. However, the equipment at the central office 25 in the present system is designed for use with a receiver attachment of the type which provides an output signal having a magnitude indicative of the operating condition of the associated receiver, and the receiver attachments 21 are thus designed to provide continuous signals on the respective telephone line pairs 22 indicating the momentary operating conditions of the associated receivers. These operating condition indicating signals are thus transmitted via the usual telephone company equipment, including the lines 24, to the central office 25.

The system of the present invention employs different D.C. voltage levels for indicating the operating condition of the receivers in the sample. For example, for indicating the tuning condition of a receiver with respect to one of four stations and also to indicate the unidentified listening, five D.C. voltage levels of, for example, 17, 26.2 volts, 36.4 volts, 49 and 70 volts might be employed. These voltages are respectively generated in the receiver attachments 21 and impressed on the associated leased telephone line pairs 22 for coupling to the central office.

Inasmuch as the operating condition signals are continuously transmitted to the central office 25, it is necessary that each of the lines 22 and 24 be of the "leased line" type since they are continuously used by the present system and no parts of the telephone connection can, therefore, be used on a time-sharing basis.

The telephone lines 24, which are connected between the telephone exchange 23 and the central office 25, terminate in a classifier and call-back unit 26 in the central office which analyzes the signals contained on each of the telephone line pairs 24 and selectively transmits to each of a plurality of minute accumulators 30, 31, 32, 33 and 34, and fifteen-minute accumulators 35, 36, 37, 38 and 39 signals which indicate the operating condition of the associated receivers. One minute and one fifteen-minute accumulator are provided for each station being monitored, and in addition, one minute and one fifteen-minute accumulator are provided for the number of receivers using television (HUT). The classifier and call-back unit 26 includes a scanning means which periodically and selectively scans each of the pairs of telephone lines 24, and if the signal on the pair of telephone lines being scanned indicates that the associated receiver is energized, then signals are sent from the classifier to each of the HUT accumulators 30 and 35. Moreover, if the signal on the pair of telephone lines 24 being scanned also indicates that the particular receiver is tuned to receive the signals being transmitted from one of the stations A, B, C, or D, signals are transmitted from the unit 26 to corresponding ones of the minute accumulators 31–34 and fifteen-minute accumulators 36–39. If the associated receiver is energized but is not tuned to any of the stations A, B, C or D, the only signal sent from the classifier and call-back unit 26 is that which goes to the HUT accumulators 30 and 35. It is apparent that when this latter condition exists the associated receiver is tuned to some other station and the operation of the receiver would be classified as "unidentified listening."

Each of the telephone lines 24 are scanned once each minute in this manner and the accumulators 30–39 store the information which is thus supplied thereto for later transmittal to a recorder or printer 40. The accumulators 30–39 are counters which count up the number of receivers which were tuned to the respective stations, and at the end of each accumulation period, supply these accumulations in the form of signals to the fast rating printer 40. The minute accumulators supply the minute totals to the printer 40 which prints them once each minute while the fifteen-minute totals from the fifteen-minute accumulators are printed once each quarter hour. A timer 42 supplies calendar time indicating signals which are printed each minute by the printer 40. Control of the printing of these totals and time indices by the printer 40 is governed by a sequence controller 41. In addition, although not shown, the HUT and station totals may be connected to a visual, fast rating display unit which periodically indicates the number of homes which were using television, the number of homes which were tuned to station A, the number which were tuned to station B, the number which were tuned to station C, and the number of homes which were tuned to station D during a preceding time interval. The signals which are coupled from the classifier and call-back unit 26 to the fifteen-minute accumulators 35–39 and accumulated throughout a full fifteen-minute period to provide the fifteen-minute totals are printed by the fast rating printer 40 during the fifteenth minute of each quarter hour immediately following the printing of the minute totals for the fifteenth minute.

In addition to the fifteenth minute totals and the fifteen-minute totals, the printer 40 prints during the fifteenth minute of each quarter hour information indicative of whether or not stations A, B, C and D were respectively carrying network programs during the preceding quarter hour.

In order to determine and supply this "program source" information to the printer 40, there is provided a program analyzer 44 which supplies to the printer 40, through the controller 41, signals which indicate whether the stations A, B, C and D were respectively carrying network programs during each preceding quarter hour. The program analyzer 44 is, in effect, a comparison device to which the network programs are supplied via a plurality of lines 45 and to which are supplied signals received by a plurality of receivers 48, 49, 50 and 51 which are tuned to receive the signals being transmitted from stations A, B, C and D. If the signals respectively supplied from the receivers 48, 49, 50 and 51 are the same as those supplied from the respective network program sources via the lines 45, the signals supplied at fifteen-minute intervals to the printer 40 from the program analyzer 44 indicate that the stations A, B, C and D carried network programs, but in the event that the signals compared by the unit 44 differ, this information is also relayed to the printer 40 which thus prints an indication that the stations in question did not carry network programs.

In order to compute the various program ratings from the information thus recorded by the printer 40, it is necessary to know the number of homes in the sample which have properly functioning receiver attachments 21. Experience has shown that the number of properly functioning home units may vary up to 10%, and as a result, if this variation in base count is not taken into account, large errors will frequently be introduced into the ratings. Accordingly, in accordance with an important feature of the present invention, the monitoring system includes means for periodically testing the operation of the equipment connected between each of the homes in the sample and the central office. Preferably, this check of the operation of the individual home units is carried out once each day and then during a time when it is very unlikely that any receiver listening will take place. Therefore, once each day in the very early hours of the morning the sequence controller 41 alters the mode of operation of the classifier and call-back unit 26 so that call-back initiating signals are sent out from the central office 25 to the receiver attachments 21. Upon receipt of the call-back signals, each receiver attachment 21 answers back in a prearranged manner which indicates if it is functioning properly in all respects. If any of the attachments 21 are not functioning properly, the base count for the day is modified and supplied through the sequence controller 41 to the printer 40 and recorded at this time. This base count check via recall actually serves two important functions. In addition to providing an accurate indication of the base count of the sample, it also enables an automatic determination of which of the receiver attachments 21 are out of order so that maintenance personnel may immediately go to the homes in question and repair the inoperative units.

*Individual Receiver Attachment*

Figure 2:
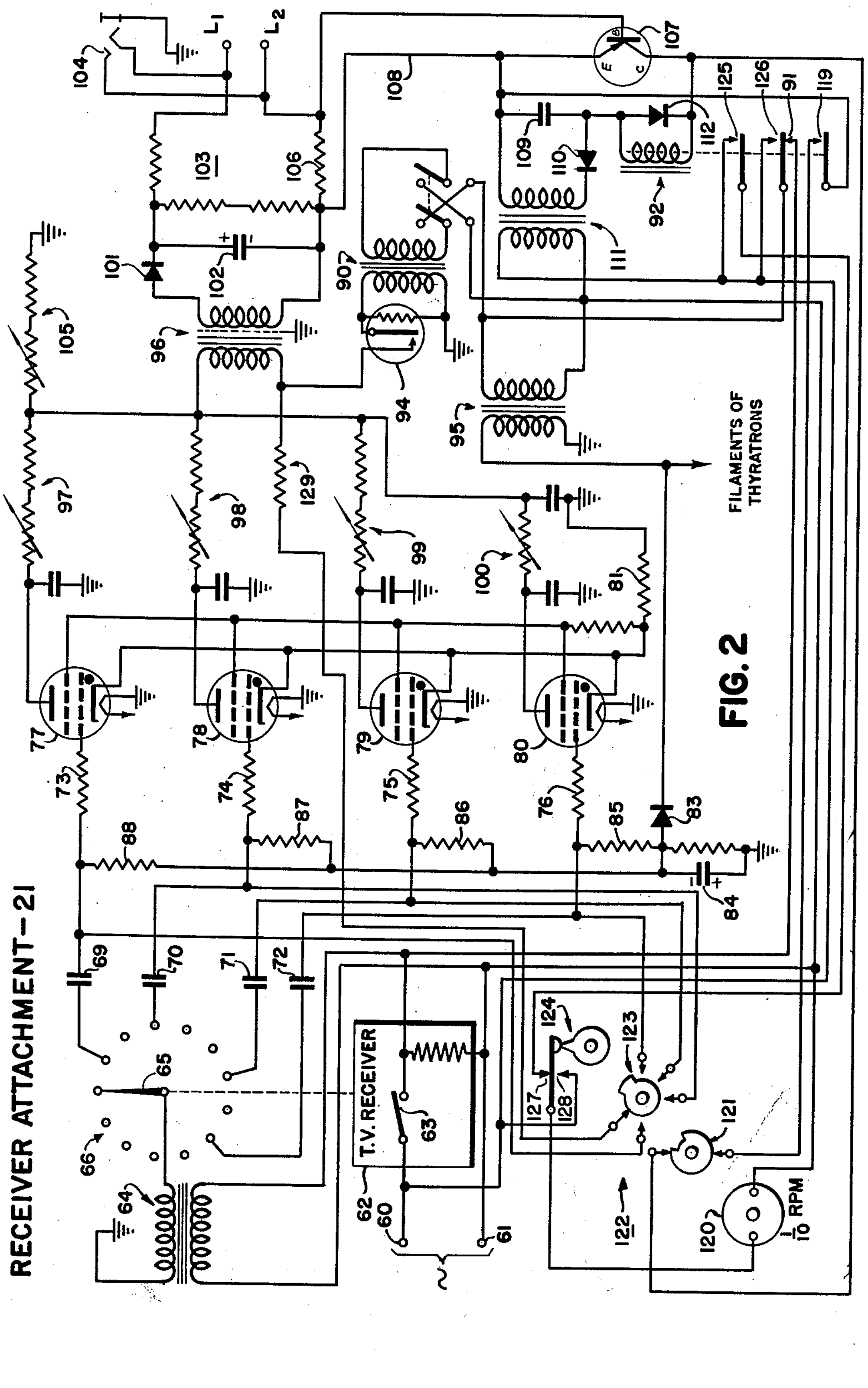
FIG. 2 is a schematic circuit diagram of a receiver attachment used in the system of the present invention.

Referring to FIG. 2, there is illustrated a receiver attachment 21 of the type which is associated with each of the television receivers in the sample under investigation. A suitable source of A.C. voltage, such as A.C. power lines, is connected across a pair of input terminals 60 and 61 and the on-off switch 63 of a television receiver 62 is serially connected with the primary winding of a regulating transformer 64 between the terminals 60 and 61. Therefore, the transformer 64 is thus energized when and only when the receiver 62 is energized.

Considering the energization circuit for the receiver attachment 21 in greater detail, the primary winding of the regulating transformer 64 is serially connected with the television on-off switch 63 between the power terminals 60 and 61 and the secondary winding of the transformer 64 is connected between ground and the wiper 65 of a multi-position station identification switch 66. The wiper 65 is mechanically connected to the channel selector shaft (not shown) of the television receiver 62 and is thus selectively positioned in accordance with the tuning condition of the receiver 62 to engage respective ones of a plurality of contact terminals of the switch 66 for each channel selecting position of the tuning shaft of the receiver. The contacts of the switch 66 thus correspond to the channels tunable by the receiver 62 and the energized one of these contacts is the one corresponding to the station or channel tuned in by the receiver 62. Since, however, all channels tunable by the receiver are not receivable in any one area, only those channels which can be received by the receiver 62 or which are being monitored are connected to the remainder of the system to supply tuning condition signals thereto. For example, in an area in which four channels are receivable by the receiver 62, those contacts on the switch 66 corresponding to these four channels are connected, as shown, via respective capacitors 69, 70, 71 and 72 to the signal generating circuit of the attachment 21.

The capacitors 69, 70, 71 and 72 are respectively connected through coupling resistors 73, 74, 75 and 76 to the signal grids of a plurality of thyratrons 77, 78, 79 and 80. The cathodes of the thyratrons 77–80 are directly connected together and are resistively coupled to ground through a resistor 81 whereby the signal voltages from the contacts of the switch 66 appear between the signal grids and cathodes of the tubes 77–80.

The thyratrons 77–80 are biased in a nonconductive condition by virtue of a unidirectional impedance device 83 which is serially connected with a capacitor 84 between ground and the secondary winding of a transformer 95 whose primary winding is normally connected between the terminals 60 and 61 when the switch 63 is closed. As shown, the filaments of the thyratrons 77–80 are also energized from the secondary winding of the transformer 95. The device 83 is so polarized that when the transformer 95 is energized the capacitor 84 is charged with the polarity indicated thereby to provide, through a plurality of grid-leak resistors 85, 86, 87 and 88, a negative D.C. bias voltage between the signal grids and cathodes of the thyratrons 77–80. This bias voltage is of such value as to maintain the thyratrons 77–80 nonconductive until the input signals from the switch 65 are superimposed thereon, at which times the thyratrons conduct.

The anode-to-cathode circuits of the thyratrons 77–80 are energized from across the secondary winding of a regulating transformer 90 which is normally energized whenever the receiver 62 is energized. The primary winding of the transformer 90, connected in parallel with the primary winding of the transformer 95, is serially connected between the terminals 60 and 61 with a set of normally closed contacts 91 of a relay 92. The relay 92, as more fully described hereinafter, is only energized during the call-back periods when the operation of the receiver attachment 21 is being checked by the central office and, therefore, during normal operation of the attachment 21, the relay 92 is released whereby the transformers 90 and 95 are connected across the source of A.C. power whenever the television receiver 62 is energized. Each of the telephone line pairs 22 comprises a set of lines L1 and L2 and the output signal which is supplied to these lines is taken from the plate circuits of the tubes 77–80. A time delay switch 94 is serially connected with the secondary winding of the transformer 90 and the anode-to-cathode circuits of the thyratrons 77–80 so as to delay the connection of plate voltage to the tubes until the filaments have been energized for a sufficient length of time to raise the cathode temperatures to the proper operating values. Upon the termination of the time delay period, the switch in the time delay unit 94 closes whereby the secondary winding of the transformer 90 is connected between ground and the anode of each of the thyratrons 77–80 through the primary winding of a signal output transformer 96.

In order to provide current levels in the transformer 96 which are indicative of the operating condition of the receiver 62 and thus the respective conditions of conduction of the tubes 77–80, a plurality of variable resistor banks 97, 98, 99 and 100, which have different predetermined values of resistance, are respectively connected between the anodes of the thyratrons 77–80 and the primary winding of the signal output transformer 96. For example, the resistance values of the networks 97–100 may be progressively less in that order and, therefore, a maximum value of current is translated by the transformer 96 when the thyratron 80 is conductive and a minimum value of current is coupled by the transformer 96 when all of the thyratrons are nonconductive. The system as thus far described operates entirely on A.C. voltage, but in order to utilize the advantages of D.C. voltage signals on the telephone lines, the voltage signal from the transformer 96 is rectified before application thereof to the lines L1 and L2. Accordingly, the output or secondary winding of the transformer 96 is serially connected with a unidirectional impedance device 101 and a filtering capacitor 102. The device 101 is so polarized that the capacitor 102 is charged as indicated and thus provides a D.C. voltage which is coupled through a balanced resistor network 103 to the telephone line pairs L1 and L2 in such manner that the line L1 is positive with respect to the line L2. The receiver attachment 21 may also include a test jack 104 which is connected across the power lines L1 and L2 to facilitate adjustment of the unit.

In the event that the television receiver 62 is energized but is not tuned to any of the particular channels which are coupled via the capacitors 69, 70, 71 and 72 to the thyratrons 77–80, none of the thyratrons 77–80 will be conductive but the transformer 90 will nevertheless be energized and the time delay switch 94 will close. Since it is desirable to provide an indication of unidentified listening so that an accurate count of the total number of homes in the sample using television may be determined in those areas where there are stations in addition to those actually being monitored, the receiver attachment 21 includes means for providing an unidentified listening signal across the telephone line pairs L1 and L2. Considered in greater detail, this means comprises a series resistive network or bleeder 105 which is connected between ground and the low voltage side of the input winding of the transformer 96 so that when the receiver 62 is energized and the thyratrons 77–80 are all nonconductive, a minimum current flows through the primary winding of the transformer 96. Obviously, this current has a value different from that which exists when any one of the thyratrons 77–80 is conductive, and therefore, the D.C. voltage which is thus impressed between the telephone line pairs L1, L2 during unidentified listening is less than that provided when any of the thyratrons 77–80 are conductive.

In order to provide an accurate check of the base count for the homes in the sample and to prevent the use by the central office of erroneous information supplied thereto from improperly operating receiver attachments 21, each of the receiver attachments 21 is checked once each day to determine if it is operating properly. This base count check is initiated at the central office in the early hours of the morning by impressing between each of the telephone line pairs L1, L2 a relatively short D.C. voltage pulse which is of appreciable magnitude and of opposite polarity to the voltage impressed on the lines L1, L2 by the receiver attachments 21 during the normal operation of the system. As shown, the signals which are impressed across the lines L1, L2 during normal operation of the system are positive at L1 with respect to L2 and thus produce a voltage drop across a resistor 106 connected between the negative side of the capacitor 102 and the telephone line L2, which is negative at the line L2. However, when the call-back initiating signal from the central office is impressed across the lines L1, L2, the current which flows through the resistor 106 irrespective of the condition of conduction of the thyratrons 77–80 is in the opposite direction to that which normally flows and thus produces across the resistor 106 a voltage drop of opposite polarity. As shown, the line L2 is directly connected to the base terminal of a transistor 107 and the junction between the resistor 106 and the capacitor 102 is coupled via a conductor 108 to the emitter terminal of the transistor 107. The current which flows between the base and the emitter of the transistor 107 when the call-back pulse is on the lines L1, L2 is amplified in the transistor 107 and operates the relay 92 whose coil is serially connected between the collector and emitter of the transistor 107 with a unidirectional impedance device 110 and the secondary winding of a power transformer 111. A filtering capacitor 109 is connected across the device 110 and the secondary winding of the transformer 111 whose primary winding is at all times connected directly across the A.C. power terminals 60 and 61. A transient suppression diode 112 is connected across the coil of the relay 92 to insure proper operation thereof. Consequently, whenever the call-back pulse appears on the telephone line pair L1, L2, the relay 92 operates and is held closed by its own holding contacts 119 which are serially connected with the secondary winding of the transformer 111 through a switch bank 121 of a rotary switch 122. The switch 122 is driven by a motor 120 and has additional switch banks 123 and 124.

When the motor 120 is energized by the operation of the relay 92, it functions to selectively render the thyratrons 77–80 conductive to provide the usual station identification signals on the lines L1, L2. Thereafter, the transformer 96 is energized through the bleeder network 105 to impress the unidentified listening signal on the lines L1, L2. Each of these signals lasts for a sufficient time to enable the central office equipment to check each attachment 21 in the sample for all five signals. Considering this circuit in greater detail, when the relay 92 is initially operated, the drive motor 120 is energized through a set of closed contacts 127 of the switch bank 124 and a set of normally open contacts 125 on the relay 92. When the relay 92 operates, a set of normally open contacts 126 thereof close and connect power to the primary winding of the transformer 90 even though the receiver 62 is not being used and the switch 63 thereof is thus open. Upon completion of the usual time delay period which enables the cathodes of the thyratrons 77–80 to be heated to their normal operating temperature, the time delay switch 94 closes thereby to provide plate potential for the thyratrons 77–80.

Shortly after the motor 120 of the switch 122 is energized, the contacts 127 open and a set of contacts 128 close. Since the contacts 128 are serially connected with the motor directly between the terminals 60 and 61, the motor remains energized for one complete revolution thereof until the actuating member of the bank 124 opens the contacts 128. As the motor rotates, the switch actuating member of the switch bank 123 selectively and successively connects the respective junctions of the capacitors 72—69 and the resistors 76—73 to the secondary winding of the transformer 90 through a resistor 129 and the switch 94. Since the time delay period for the closing of the switch 94 is less than the time required for the switch 122 to connect the resistor 129 to the input circuit to the thyratron 80, the switch 94 is closed in a sufficiently short time so that the thyratrons 77–80 are successively rendered conductive as the motor 120 rotates through one complete revolution. The motor 120 may be, for example, a $1/10$ r.p.m. motor and the wiper of the switch bank 122 is of the proper width so that each of the thyratrons 77–80 is energized for approximately one and one-half minutes thereby giving the central office time to scan all of the receiver attachments 21 in the system to determine whether or not correct voltages are being supplied therefrom to the telephone lines 22. Just prior to the end of the call-back cycle which terminates when the motor has made one complete revolution, the switch 121 is opened to open the holding circuit for the relay 92 and to cause the relay 92 to release. Consequently, when the contacts 128 later open and the contacts 127 close, the motor is deenergized, and the closed contacts 127 prepare the circuit for energizing the motor 120 when the next call-back initiating signal is received.

It may thus be seen that upon receipt of the call-back initiating signal from the central office each of the receiver attachments 21 is automatically set into a call-back sequence of operation wherein each of the four station identification signals are selectively impressed on the associated line pair L1, L2 and thereafter the unidentified listening signal is placed on the line pair L1, L2. Moreover, these signals are respectively impressed upon the line for a relatively long period of time so that the central office equipment may check, as a group, all of the homes in the sample for each station identification signal and for each unidentified listening signal.

*Central Office Equipment*

Figure 11:
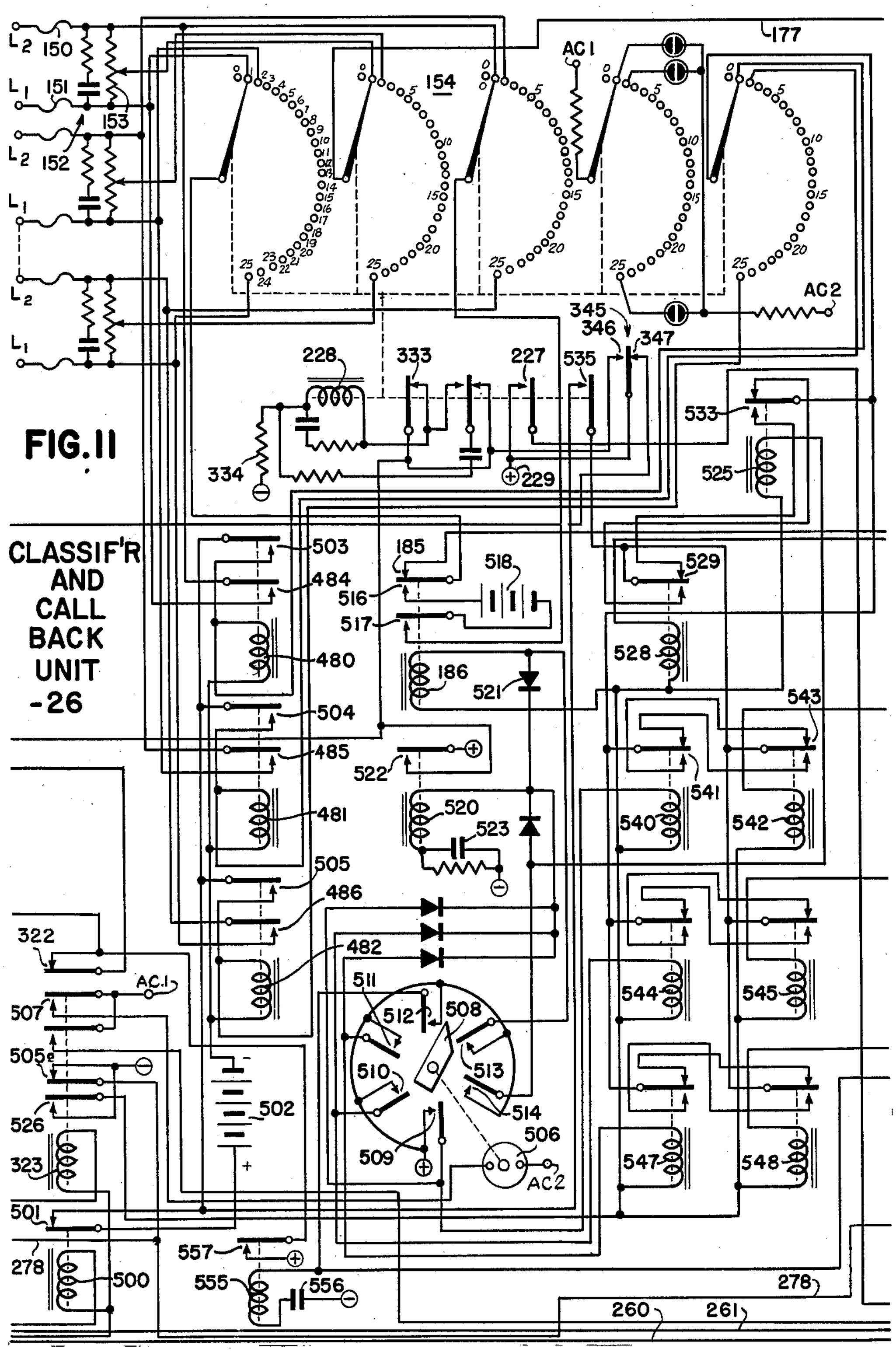
Figure 12:
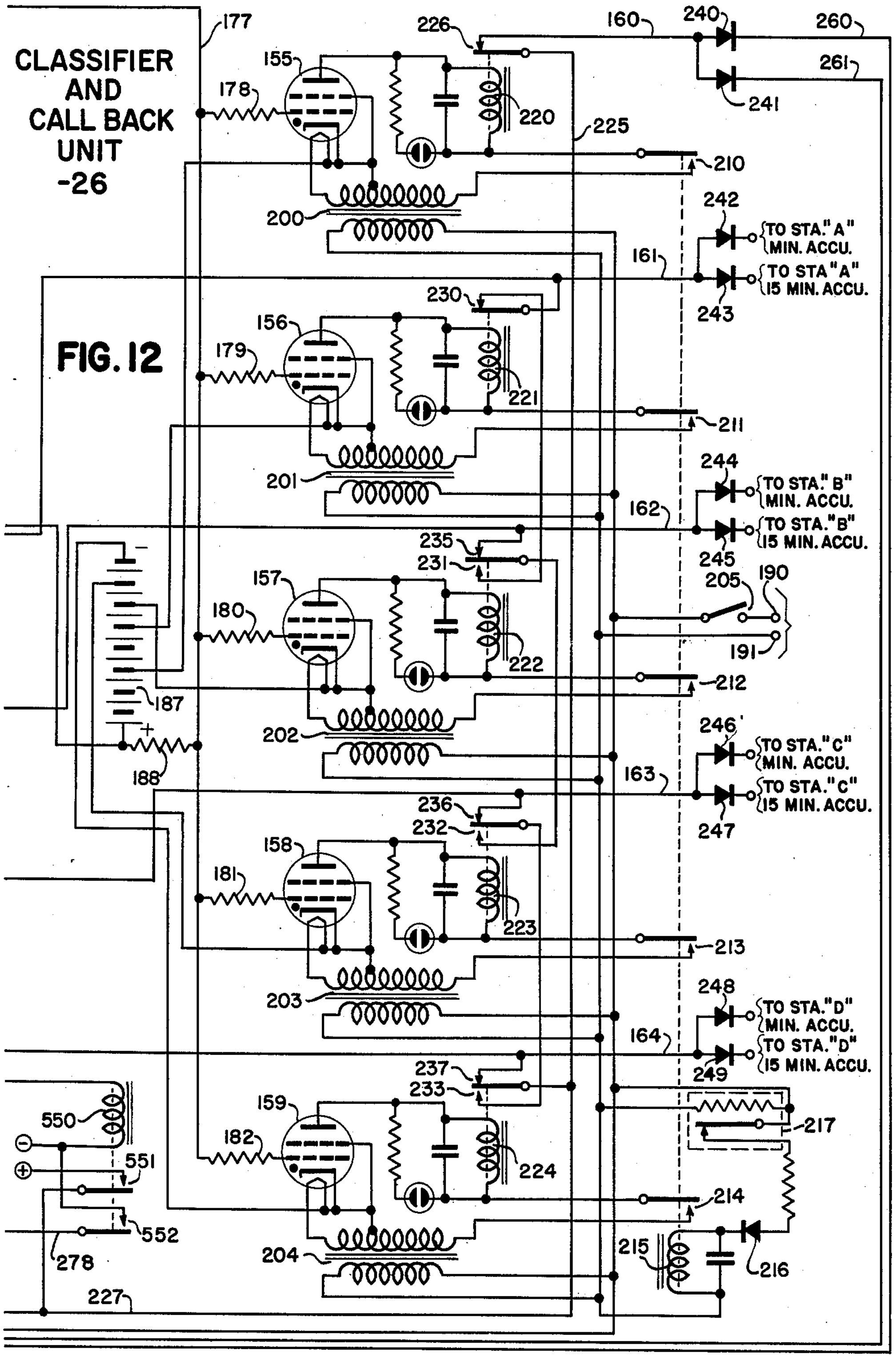
Figure 13:
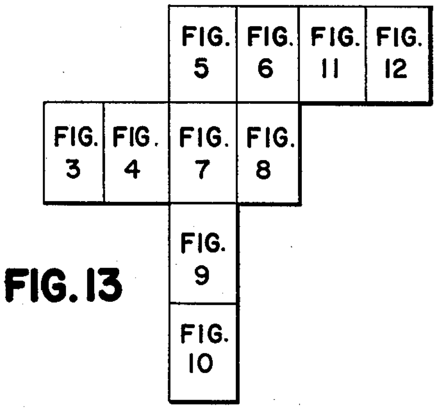

Referring now to FIGS. 3–12, there is shown a schematic circuit diagram of the central office equipment 26, and to facilitate an understanding of the system the sheets of drawings carrying the FIGURES 3–12 may be assembled into a unitary diagram in the manner shown in FIG. 13.

Referring particularly to FIGS. 11 and 12 wherein is shown the classifier and call-back unit 26, there is shown in FIG. 11 the termination of a plurality of line pairs L1, L2 of the telephone lines 24 which are respectively and continuously connected to respective lines L1, L2 of the telephone line pairs 22 by switching equipment in the telephone exchange 23. The lines L1, L2 are respectively connected through suitable fuses 150 and 151 to a plurality of RC matched terminating impedances 152. It will be understood that there are as many pairs of lines L1, L2 coming into the central office as there are receivers in the sample but for purposes of clarity only three such pairs of lines have been shown.

In order to equalize the voltages supplied from the different pairs of lines L1, L2 to the classifier and call-back unit 26 at the central office, a plurality of potentiometers 153 are respectively connected across the terminating impedances 152. Since the same central office equipment is used for all telephone line pairs, and since the D.C. voltage level of the signals supplied to the classifier 26 is indicative of the operating conditions of the receivers, the potentiometers 153 are adjusted so that the output voltages therefrom are equal for the same operating condition of all receivers irrespective of the absolute magnitude of the D.C. signals which are developed across the outputs of the telephone line pairs L1, L2 at the central office 25. All of the receiver attachments 21 are adjusted to impress the same absolute value of voltage on the associated line pair L1, L2 for corresponding uses of the receivers. Therefore, because of the inherent attenuation of the telephone lines, those receiver attachments which are farthest from the central office 25 will ordinarily produce the lowest level of signal at the central office; the potentiometers 153 which are associated with the less distant receivers are adjusted to reduce the voltage level of the signals supplied thereto to that level which is produced by the receiver attachments which are most distant.

The signals which are provided on respective telephone line pairs L1, L2 are sampled once each minute by scanning means comprising a stepping switch 154 which selectively couples the D.C. signals from the potentiometers 153 to a classifying means comprising a plurality of differently biased thyratrons 155, 156, 157, 158 and 159. The thyratrons 155–159 are normally conductive and the biasing voltages are selected so that the thyratrons 155–159 would be successively cut off in numerical order by an increasing signal voltage supplied to all of the signal grids thereof. The thyratrons 155–159 selectively provide on a plurality of output conductors 160, 161, 162, 163 and 164 voltages which indicate, by virtue of the particular ones of the conductors 160–164 on which they appear, the operating condition of the receiver whose telephone lines L1, L2 are presntly being scanned. For example, when the line 160 is energized, it indicates that the receiver being checked is energized, and the particular one of the remaining conductors 161–164 which is energized indicates the particular station to which that receiver is tuned. Therefore, for all identified listening, the conductor 160 and another one of the conductors 161–164 is energized; for unidentified listening only the conductor 160 is energized; and if the particular receiver being scanned is not being used, none of the conductors 160–164 is energized.

Considered in greater detail, the stepping switch 154 includes five banks or levels of switch contacts, and the wipers of all of the banks which are ganged together for simultaneous operation selectively engage the contacts in the respective banks thereof. In order to facilitate an understanding of the present invention, it is particularly described in connection with a simple twenty-five home sample wherein twenty-five sets of telephone lines L1, L2 terminate at the central office and the stepping switch 154 has twenty-five off normal switching positions and a zero or normal position. However, where expedient, switches having more or less contact positions may be employed without altering the mode of operation of the system, and a plurality of switches 154 may be provided.

The first and second banks of the switch 154 are used during normal operation of the system to scan the sets of telephone lines L1, L2 and to selectively couple the voltages provided thereon to the thyratrons 155–159. The wiper of the second bank is connected through a conductor 177 and a plurality of resistors 178, 179, 180, 181 and 182 to the signal grids of respective ones of the thyratrons 155–159, and inasmuch as the contacts of the second bank are respectively connected to the adjustable taps on the potentiometers 153 and thus to a tapped down point on the L1 side of the telephone lines, the negative side of each telephone line pair L1, L2 is adapted to be connected to the signal grids of the thyratrons 155–159. The wiper of the first bank is connected through a set of normally closed contacts 185 of a relay 186 and respective portions of a battery 187 to the cathodes of the thyratrons 155–159, and inasmuch as the contacts on the first bank are respectively connected to the sides of the potentiometers 153 which are connected to the telephone lines L2, the lines L2 are adapted to be selectively connected to the cathodes of the thyratrons 155–159 simultaneously with the connection of the tapped down point of the associated line L1 to the signal grids of the thyratrons 155–159. Accordingly, the D.C. voltages between the plurality of telephone line pairs L1, L2 are selectively impressed between the signal grids and cathodes of thyratrons 155–159 and are of a negative value to render certain ones of the thyratrons nonconductive depending upon the amplitude of the signals being scanned.

As shown, the signal grids of the thyratrons 155–159 are connected to the positive pole of the battery 187 through a resistor 188 and the cathodes of the thyratrons 155–159 are connected to respectively different tapping points along the battery 187. As shown, the maximum voltage between a control grid and associated cathode occurs in the case of the thyratron 159 whose cathode is connected to the most negative point on the battery 187. The cathode of the thyratron 158 is connected to a tap on the battery 187 which is somewhat less negative, the cathode of the thyratron 157 is connected to a tap on the battery 187 which is still less negative and so on, the thyratron 155 having the least bias voltage impressed between its cathode and signal grid and therefore being rendered by any of the five signals which may be impressed on the lines L1, L2. The classifying circuit is designed so that the thyratrons 155–159 are normally conductive and are rendered nonconductive only by the receiver listening signals so that short bursts of noise which may develop on the telephone lines L1, L2 will not alter the operations of the thyratrons 155–159 and thus be interpreted as a listening signal. Consequently, the classifier section 26 is substantially immune to noise.

Inasmuch as each of the thyratrons 155–159 is biased differently, the number which are rendered conductive by any one voltage signal supplied between the signal grids and cathodes thereof from the stepping switch 154 is dependent only upon the magnitude of that signal. Since the thyratron 155 has a minimum of positive bias provided between its signal grid and cathode the lowest signal voltage, which signifies unidentified listening, causes the thyratron 155 to be rendered nonconductive. The second lowermost signal voltage, which signifies listening to station A, causes both the thyratrons 155 and 156 to be rendered nonconductive and so on until the greatest of the signal voltages, which signifies listening to station D, causes all five of the thyratrons 155–159 to be rendered nonconductive.

The classifier and call-back unit 26 is energized from across a pair of power terminals 190 and 191 which are connected to a suitable source of A.C. power. The anode-to-cathode circuit of each of the thyratrons 155–159 is energized through a respective one of a plurality of transformers 200, 201, 202, 203 and 204, the primary windings of the transformers 200–204 all being connected in parallel and respectively connected in series with a simple on-off switch 205 across the power terminals 190 and 191. The filaments of the thyratrons 155–159 are respectively connected across tapped down portions of the secondary windings of the transformers 200–204 and the anode-to-cathode circuits of the thyratrons 155–159 are connected across the remaining portions of these secondary windings. Serially connected with the latter portions of these secondary windings and the anodes of the respective thyratrons 155–159 are normally open contacts 210, 211, 212, 213 and 214 of a power relay 215. The winding of the relay 215 is serially connected with a unidirectional impedance device 216 and a thermal time delay switch 217 between the terminal 191 and the switch 205 so that the anode circuits of the thyratrons 155–159 are not energized until the cathodes have been properly heated.

In order to selectively supply listening signals to the lines 160–164, a plurality of relays 220–224 are respectively connected in circuit relationship with the thyratrons 155–159 so as to be released whenever the associated thyratron is rendered nonconductive. Accordingly, the windings of the relays 220, 221, 222, 223 and 224 are serially connected between the anodes of the thyratrons 155–159 and respective sets of the contacts 210–214, and a plurality of capacitors are respectively connected across the windings of the relays 220–224 so that with the thyratrons 155–159 positively biased, the relays 220–224 remain energized even though the thyratrons are energized with an A.C. voltage. The relay 220 is provided with a set of normally closed contacts 226 which are connected between the conductor 160 and a conductor 225 which is connected through a set of normally open contacts 227 on a relay 228 to a terminal 229 (center of FIG. 11) connected to the positive terminal of a battery (not shown). Therefore, the conductor 160 is connected to a positive battery whenever the thyratron 158 is rendered nonconductive for a sufficient length of time to release the relay 220. This occurs when a station identification or an unidentified listening signal is supplied to the grid of the thyratron 155 from a set of telephone lines L1, L2. As hereinbefore indicated, whenever a signal is thus provided on the line 160, it indicates that the particular receiver being scanned at that time is in use, and therefore, the line 160 is a HUT line.

If the receiver being scanned is tuned to one of the stations A, B, C or D, then in addition to the HUT conductor 160, one of the conductors 161–164 must also be energized. However, the others of these conductors 161–164 should not be energized since it is apparent that at any given time a single receiver can be tuned to only one station. If, for example, station D is tuned in whereby a maximum signal voltage is provided between the line pair L1, L2 all five of the thyratrons 155–159 are cut off but only the conductor 164 should be energized. The requirements of the circuit are the same for the other three monitored stations A, B and C. Therefore, in order to energize only one of the conductors 161–164 irrespective of the number of corresponding thyratrons which are energized, the relay 221 has a set of normally closed contacts 230 which are connected in the circuit between the positive battery terminal 229 and the conductor 161 with respective sets of normally open contacts 231, 232 and 233 on the relays 222–224. Therefore, a signal is impressed on the conductor 161 only when the thyratron 156 is nonconductive and the latter three thyratrons 157, 158 and 159 are conductive, since if any of these latter thyratrons are nonconductive, their associated normally open contacts 231, 232 or 233 will be open and the circuit between battery and the conductor 161 is broken. In similar fashion, a set of normally closed contacts 235 on the relay 222 is connected between the conductor 162 and the normally open contacts 232 of the relay 223, a set of normally closed contacts 236 on the relay 223 is connected between the conductor 163 and the normally closed contacts 233 of the relay 224, and a set of normally open contacts 237 on the relay 224 is directly connected between the conductor 164 and the positive battery terminal 229.

As the stepping switch 154 is operated so as to scan each of the telephone line pairs L1, L2, different ones of the thyratrons 155–159 are rendered nonconductive in accordance with the operating conditions of the receivers being monitored and operating condition information is provided in the form of D.C. voltages selectively coupled to the lines 160–164. Preferably, each of the receivers in the sample is scanned once each minute, and therefore, at discrete intervals during each minute, operating condition signal voltages for each receiver are selectively provided on the conductors 160–164. As illustrated in FIG. 1, the output signals from the classifier and call-back unit 26 are coupled to respective ones of a plurality of minute accumulators 30–34 and in addition to a plurality of fifteen-minute accumulators 35–39. Accordingly, the signal voltages which appear on the conductors 160–164 are coupled through respective sets of decoupling diodes 240–249 to the minute and fifteen-minute accumulators.

The minute accumulators 30–34 are identical and the fifteen-minute accumulators 35–39 are identical. Therefore, in order to facilitate an understanding of the present invention, only the HUT minute accumulator 30 and the HUT fifteen-minute accumulator 35 are illustrated and described in detail. It will be understood, however, that the other accumulators 31–34 and 36–39 are identical and operate in a similar manner in response to station identification signal voltages on the corresponding conductors 161–164. Accordingly, in FIG. 10 there are shown detailed circuit diagrams of the HUT accumulator 30 and of the HUT fifteen-minute accumulator 35.

As shown, the diode 240 connects the HUT signal voltage from the conductor 160 through a conductor 260 to the HUT minute accumulator 30, and the diode 241 connects the HUT signal voltage through a conductor 261 to the HUT fifteen-minute accumulator 35. The remaining-diodes 242–249 are similarly connected between the conductors 161–164 and the stations A, B, C and D minute and fifteen-minute accumulators 31–34 and 36–39, shown in block diagram form in FIG. 9.

The HUT minute accumulator 30 is a switch-type counter and comprises three stepping switches respectively designated 265, 266 and 267, which constitute the hundreds, tens and units sections of the counter. The switches 265–267 are shown in the bero or normal position, and the tens and units switches 266, 267 each comprise two banks of contact segments and corresponding wipers, one section of each double bank being a control section and the other section being a read-out section. Only one bank is provided in the hundreds switch 265. The units switch 267 is stepped one contact position each time that a pulse of voltage is supplied to the accumulator 30 through the conductor 260, and is driven by a stepping solenoid 268 which is connected between ground and the conductor 260 and operates a set of normally open contacts 269 and a set of normally closed contacts 270. The winding of a transfer relay 277 is connected between ground and ninth and nineteenth contact on the control bank of the switch 267, and the wiper of this bank is connected via a conductor 274 to a positive battery terminal 275. The ground connections for all of the accumulators and the sequence control unit 41 are through a conductor 278 and a set of normally open contacts 505 on a relay 323 (FIG. 11) or a set of normally open contacts 552 on a relay 550 (FIG. 12).

When the solenoid 268 operates and releases to step the units switch 267 to the ninth contact position, the relay 277 operates to close a pair of contacts 279 so that the positive battery from the terminal 275 is forwarded through the closed contacts 279 to the open contacts 269. When the next succeeding pulse, which is the tenth pulse, is impressed on the conductor 260, the solenoid 268 is actuated to close the contacts 269 and thus connect the positive voltage from the closed contacts 279 to a stepping solenoid 281 which operates the wipers of the tens stepping switch 266. The tenth pulse thus steps the units switch 267 one step to the tenth position, and steps the tens switch 266 to the first off-normal position. The switches 265–267 are each twenty position switches, and since the ninth and nineteenth contacts of the units switch 267 are connected to the winding of the relay 277, the tens switch 266 steps one position on every tenth pulse. The hundreds switch 265 is connected to the tens switch 266 in the same manner as the tens switch is connected to the units switch 267 so that on every tenth step of the tens switch 266, the hundreds switch 265 is operated by a solenoid 288 to step one position. Since the system of the present invention is designed for use with no more than 999 homes in a sample, the hundreds stepping switch 265 need not provide any control function and therefore includes only a read-out bank.

As is described in greater detail hereinafter, all of the minute accumulators 30–34 are reset to zero at the end of each minute following the printing of the information which is contained in these accumulators, and the fifteen-minute accumulators 35–39 are similarly reset at the end of each fifteen-minute period. Since the circuitry in each of the minute and fifteen-minute accumulators is identical, a detailed description of the operation of the HUT fifteen-minute accumulator 35 is unnecessary for an understanding of the system of the present invention. It should be understood, however, that at the end of each minute the positions of the wipers of the minute accumulators indicate the totals of receivers operated in the corresponding manners during the preceding minute, and at the end of each quarter hour the positions of the wipers of the fifteen-minute accumulators indicate the number of homes whch were operated each minute in the corresponding manner during the preceding quarter hour.

*Sequence Controller Operation During Normal One to Fourteen-Minute Periods*

The central office equipment is set into operation once each minute by means of a master timing motor 300 (FIG. 5) which is connected directly across an A.C. power line connected to A.C. power terminals AC1 and AC2 and which drives a rotatably mounted switch actuating armature 303 at one revolution per minute, thereby to close a switch 304 once each minute. When the switch 304 is closed, it connects a positive D.C. voltage from a suitable battery terminal 305 through a set of normally open contacts 306 of a relay 307 to the actuating solenoid 308 of a stepping switch 310 and thence through a set of normally open contacts 311 of the relay 307 to ground. The coil of the relay 307 is connected directly across the A.C. power lines so that whenever power is supplied to the central office the relay 307 is actuated. Therefore, during normal operation of the system, the normally open contacts 306 and 311 are closed, and when the switch 304 is closed once each minute the stepping switch 310 is advanced one position. Also, each time that the switch 304 closes, a stepping switch 315 (FIGS. 7 and 8) is advanced one position by the energization of its stepping solenoid 316. One terminal of the solenoid 316 is connected to ground via the conductor 278, and the other terminal is connected to the battery terminal 305 through a set of normally open contacts 317 which are controlled by the solenoid 316, a set of normally open contacts 318 on a relay 319, the wiper of the third bank of the stepping switch 315 to the first contact segment thereof, a conductor 321 to a set of normally closed contacts 322 on a relay 323 (FIG. 11), and a conductor 324 to the switch 304. The relay 319 is energized at this time and during each of the first fourteen minutes of every quarter hour, except during call-back, over a circuit extending from ground through the winding of the relay 319, a conductor 325, a shunting member 326 which short-circuits together the first fourteen contacts on the second bank of the stepping switch 310, and the associated wiper to a positive battery terminal 327. The relay 323 is released at this time since the energization circuit for the coil thereof is through the sixth contact to the wiper in a second contact bank of a stepping switch 329 (FIG. 6), which switch is the units digit section of a quarter hour indicator of the timer 42. Therefore, unless the switch 329 is in the sixth position which controls the base count check, the relay 323 is released.

It may thus be seen that when the relay 319 is operated, the first and third banks of the switch 315 are effective, and by virtue of the fact that the first two contact segments in the third bank of the stepping switch 315 are short-circuited together, the stepping switch 315 continues to step to the second off-normal contact position When the stepping switch 315 reaches the second position, the first switch bank thereof connects the voltage from a terminal 331 to the stepping solenoid 228 of the home scan switch 154 whch steps it to the first off-normal contact position. This circuit is as follows: A voltage from the positive battery terminal 331 (FIG. 7) is connected through a set of normally open contacts 332 on the relay 319 through the first bank of the stepping switch 315, through a set of normally closed contacts 333 and to the solenoid 228, the other side of the solenoid 228 being connected to battery ground through a resistor 334. With the wipers of the home scan switch 154 in the first contact position, the voltage signal on the first set of telephone lines L1, L2 is coupled to the input circuit of the thyratrons 155–159 in the manner heretofore described thereby to supply to the minute and fifteen-minute accumulators 30–39 respective pulses of voltage indicative of the operating condition of the first receiver. The switch 154 is of the conventional self-stepping type and includes a set of C-spring type off-normal contacts 345 comprising a set of contacts 346 which are open when the switch 154 is in the normal or zero position, and a set of contacts 347 which are open when the switch 154 is in all positions other than the zero or normal position. The contacts 346 are interconnected between the positive battery terminal 229 and the stepping contacts 333 so that the switch 154 self-steps from the first contact position to the zero or normal contact position and stops unless an external stepping voltage is then supplied thereto.

At the time that the switch 154 is initially being stepped to the first contact position, the switch 315 is stepped to the third contact position through the off-normal contacts 347 and the third bank of the switch 315. As the switches 154 and 315 thus step to the first and third contact positions, respectively, the off-normal contact 347 on the switch 154 opens, thereby to open the energization circuit for the stepping solenoid 316 of the switch 315. The switch 315 thus stops in the third contact position.

During the scanning of the twenty-five telephone line pairs L1, L2 which are respectively connected to contact segments of the home scan switch 154, the operating condition signals of the associated receivers are classified and recorded in the minute and fifteen-minute accumulators 30–39 in the manner heretofore described. When the switch 154 returns to the zero or normal position, the contacts 347 close and the switch 315 is stepped to the fourth contact position through the off-normal contacts 347 which are now closed and which connect the positive voltage terminal 229 to the stepping solenoid 316 through the third switch bank of the switch 315. When the wiper of the first bank of the stepping switch 315 engages the fourth contact segment, another home scan stepping switch (not shown), identical to switch 154 and having the output thereof connected to the classifying thyratrons 155–159, is set into operation in the same manner as was the switch 154 when the switch 315 stepped to the second contact position. The contacts of the second home scan switch are connected to similar sets of telephone lines L1, L2 as are the contacts of the switch 154, and whereby a second group of twenty-five receivers are scanned and the operating conditions thereof recorded by the minute and fifteen-minute accumulators. Then the switch 315 is stepped by a stepping voltage supplied to the solenoid 316 via the off-normal contacts of the second home scan switch and the third bank of the switch 315 to the sixth position wherein a third home scan stepping switch is set into self-stepping operation and a third group of twenty-five homes are checked. Similarly, the stepping switch 315 is then caused to step to the eighth contact position and a fourth home scan stepping switch is set into self-stepping operation whereby the remainder of one hundred homes are scanned and their operating conditions recorded.

Figure 9:
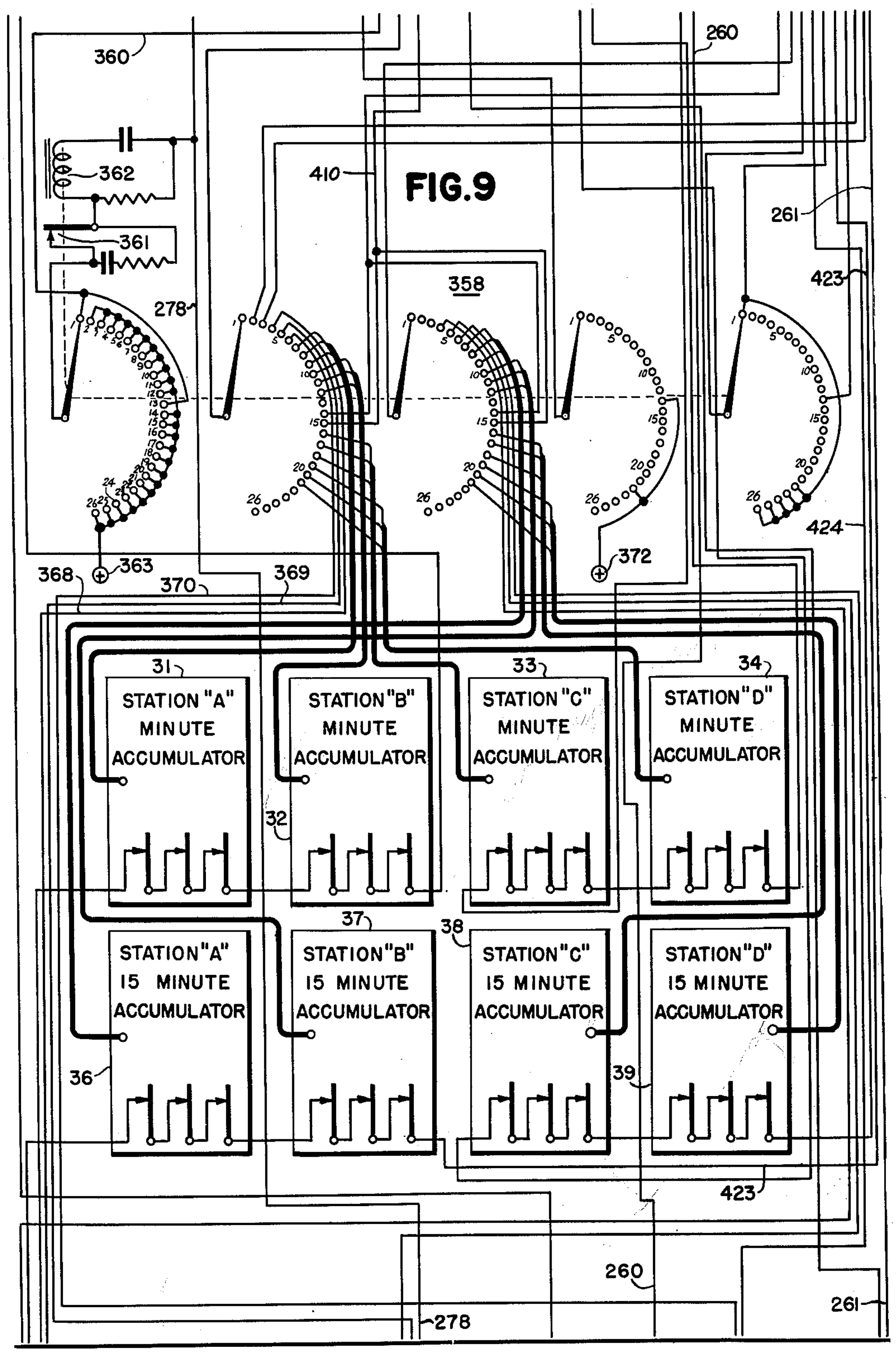
Figure 10:
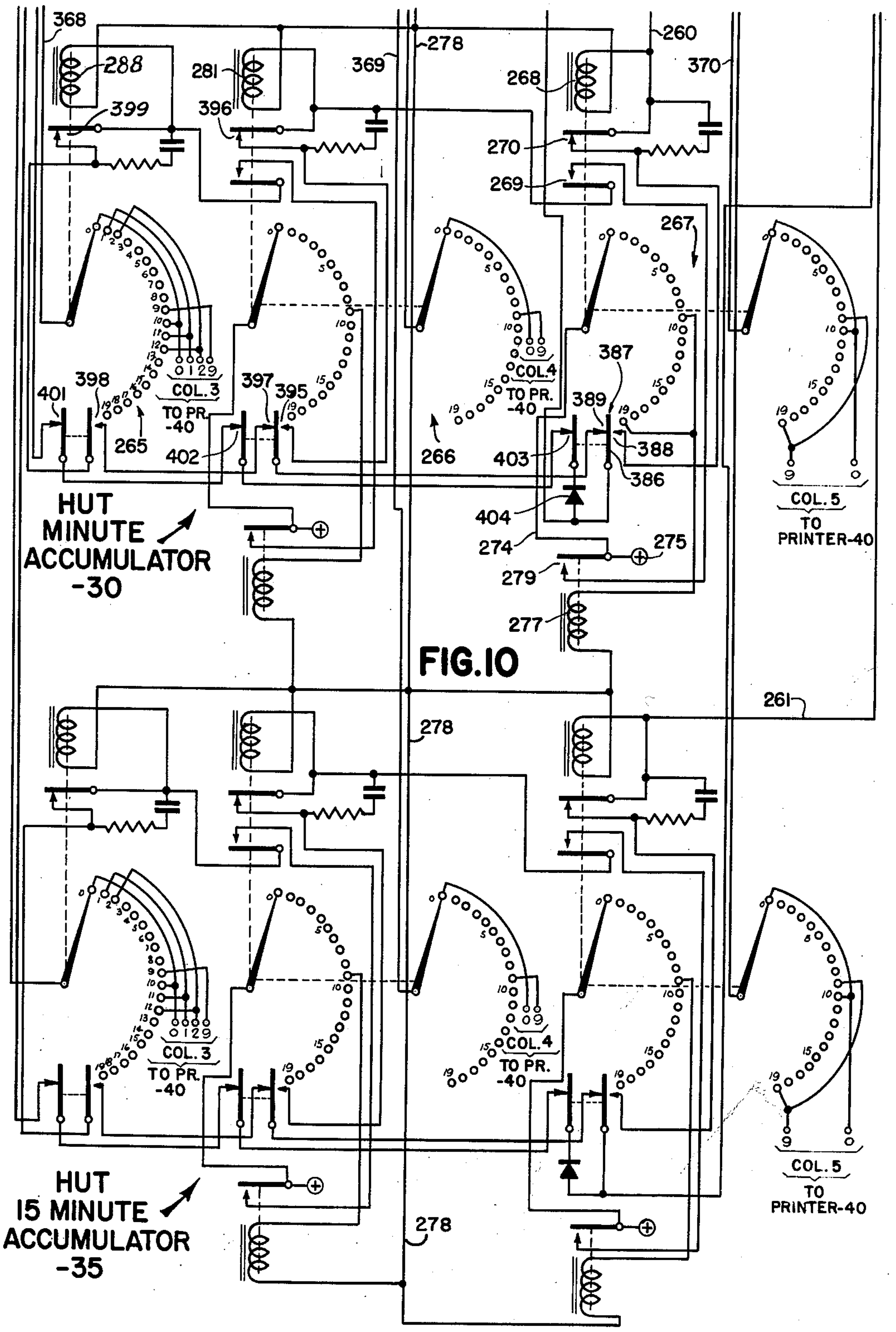

When the last home scan switch reaches its normal or zero position, its off-normal open contacts are closed, which steps the switch 315 to the tenth contact position. Positive battery is thus connected through the first bank of switch 315 and a conductor 405 to the coil of a relay 350 which is provided with a set of normally open power contacts 351 connected between a set of normally closed contacts 353 on a relay 354 and the wiper of the second bank of a print control stepping switch 358 (FIG. 9). The relay 354 is released when normal operation of the system is desired, but it may be operated by the closure of a switch 355 whenever it is desired to suppress the printing of the one-minute totals while continuing to print the fifteen-minute totals. Accordingly, under normal operation the relay 354 is released and the contacts 353 are closed so that A.C. power is connected from an A.C. power terminal AC1 through the contacts 351 to the wiper of the second bank of the stepping switch 358. In addition, the tenth contact segment of the first bank of the switch 315 connects positive battery through a diode 359 and a conductor 360 to the first and thirteenth contacts of the first bank of the stepping switch 358. The wiper of this first bank is connected through a set of normally closed stepping contacts 361 to a stepping solenoid 362 for the switch 358, the other end of the solenoid 362 being capacitively connected to ground via the conductor 278. Therefore, when the last home is scanned and the switch 315 steps to the tenth contact position, operation of the stepping switch 358 is initiated which causes the wipers thereof to move to the first off-normal contact position. Inasmuch as the first eleven off-normal contact positions of the first bank of switch 358 are connected to a positive battery terminal 363 and the wiper is connected through the self-stepping contacts 361 to the stepping solenoid 362, once the switch 358 is stepped to its second contact position it self-steps to the thirteenth contact segment. As the switch 358 advances to the thirteenth contact position, the wiper thereof successively contacts the first twelve contacts. When the wiper of the second bank of switch 358 engages the second contact, A.C. voltage is coupled to the wiper of the fourth bank of the stepping switch 310. The fourth and fifth banks of the switch 310 respectively are ten-minute and fifteen-minute read-out switches used in identifying the minute of the quarter hour being printed.

Figure 14:
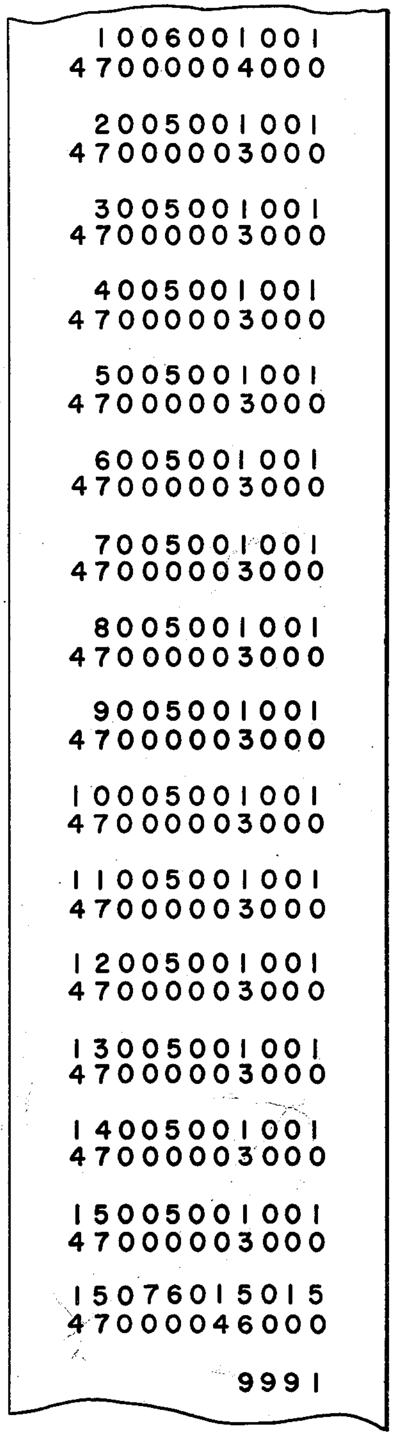
FIG. 14 is a fragmentary view of the fast ratings provided by the system of the present invention.

Refering to FIG. 14, there is shown a typical fifteen-minute record as printed by the fast rating printer 40 during a quarter hour interval. The printer 40 is preferably a Clary printer which prints an eleven digit row of figures from zero to nine. This printer has eleven columns of nine input terminals to which memory means are connected for storing information supplied thereto until the next print order is given, at which time one of the numerals one through nine is printed in each of the columns in accord with the particular input terminals which were energized since the previous print order.

In the system of the present invention two rows of figures are printed for each minute of time, so that the information concerning the first minute of scan is that appearing in the first two rows, the information concerning the second minute is printer in the second two rows, etc.

Considering the information pertaining to the first minute of scanning, the first two digits in the first row identify the minute of the quarter hour, the next three digits indicate the number of homes using television (HUT), the next three digits indicate the number of homes tuned to station A, and the last three digits indicate the number of homes tuned to station B. In the second row of the first minute's information the first two digits indicate the quarter hour of the day, the forty-seventh quarter hour data being shown in FIG. 14, the next three digits indicate the number of homes which are tuned to station C, and the next three digits indicate the number of homes which are tuned to station D. The last three digits are not used in the present system and, therefore, are always printed as zeros, since the printer 40 is such that when no signal is supplied to any of the input terminals thereof and a print order is given to the printer, the figure 0 is printed in each unenergized column so long as one of the preceding input terminals is energized; otherwise no print is made. Accordingly, for the first minute of operation the first digit in the first row is not printed, no signal being supplied to the first column of the printer by virtue of the fact that the first nine contacts in the fourth bank of the switch 310 are open. However, in the tenth to fifteenth minutes of the quarter hour, the fourth bank of the switch 310 supplies a voltage to terminal one of the first digit input terminal of the printer 40.

When the stepping switch 358 moves to the third contact position during the first minute of each quarter hour, a voltage is connected by the second bank thereof to the wiper of the fifth or units read-out bank of the stepping switch 310 thereby to couple a voltage to terminal one of the second digit input terminals of the printer 40. In the fourth contact position of the stepping switch 358, the second bank thereof connects the A.C. voltage through a conductor 368 to the wiper of the hundredths digit HUT stepping switch 265. Had one hundred or more receivers in the sample been energized during the preceding minute, which condition is, of course, impossible in the illustrated system, the wiper of the HUT stepping switch 265 would be in engagement with the second contact position, which, as shown, is connected to the numeral one, third digit input terminal to the printer 40. However, if less than one hundred of the receivers in the sample were energized during the preceding minute, the wiper of the switch 265 would be in the zero or normal position as shown and, therefore, no voltage would be impressed on any of the terminals in the third digit column of the printer 40.

When the switch 358 steps to the fifth contact position, positive battery is connected through the second bank thereof to a conductor 369 which is connected to the wiper of the read-out bank of the tens HUT stepping switch 266 thereby to connect one of the fourth digit column input terminals of the printer 40 to positive battery. The printer terminal to which battery is connected corresponds to the number of tens of receivers which were energized during the preceding minute. The stepping switch 358 next steps to the sixth contact segment to energize a conductor 370 which is connected to the wiper of the units read-out bank of the stepping switch 267 thereby to connect a voltage to the appropriate one of the fifth digit terminals of the printer 40. As a result, a three-figure HUT identification signal is supplied to the printer 40 as the switch 358 steps through the fourth, fifth and sixth positions or the third, fourth and fifth off-normal positions. As the switch 358 steps through the next six or seventh through twelfth positions, the information contained in the network A minute accumulator 31 and the network B minute accumulator 32 is similarly supplied to the printer 40. This information is stored in the printer 40 and when the switch 358 steps to the twelfth off-normal or thirteenth position, the minute identification information, the HUT information, the station A information, and the station B information are printed.

Considering the print order circuit in greater detail, when the wiper in the fourth section of stepping switch 358 reaches the thirteenth contact, it connects a positive battery terminal 372 to the winding of a print order relay 373 which operates and connects through its normally open power contacts 374 an A.C. voltage from the conductor 352 and contacts 353 to the print solenoid 375 of the fast rating printer 40. The other end of the solenoid 375 is directly connected to an A.C. terminal AC2 whereby the printer 40 prints the information which had previously been stored therein. At the end of the print cycle when an eleven digit row has been printed, the printer 40 closes a switch 376 therein which connects a positive battery terminal 377 through a conductor 378 to the tenth off-normal contact segment of the third bank of the stepping switch 315 and thence through the contacts 318 to the stepping solenoid 316 of the switch 315. This steps the switch 315 to the eleventh off-normal contact position.

When the stepping switch 315 steps to eleventh contact position, the HUT, station A, and station B minute accumulators are reset. Considering this reset circuit in detail, reset voltage is coupled from the wiper of the first bank of switch 315 to the reset voltage input of the HUT minute accumulator 30. As shown, reset input of the accumulator 30 is connected to a common contact member 386 of a C-spring type off-normal switch 387 associated with the units scanning switch 267. With the switch in an off-normal position, a set of off-normal contacts 388 thereof are closed thereby to connect the reset voltage to the stepping contacts 270 of the solenoid 268. Accordingly, the solenoid 268 continues to step the units switch 267 until it reaches its normal or zero position, at which time the contacts 388 are open and a set of contacts 389 are closed. When the contacts 389 close, the reset voltage from the switch 315 is coupled through a set of off-normal contacts 395 on the tens stepping switch 266. The contacts 395 are closed if the switch 266 is in an off-normal position and thus connect the reset voltage to a set of stepping contacts 396 of the stepping solenoid 281 of the switch 266 thereby to cause the tens switch 266 to step to the normal or zero position. When the switch 266 reaches the zero position, the contacts 395 open and a set of contacts 397 close. The contacts 397 then connect the reset voltage to a set of off-normal contacts 398 on the hundreds stepping switch 265. The contacts 398 are connected to a set of stepping contacts 399 of the stepping switch 265 and thus to the stepping solenoid 288 which thus steps the hundreds switch 265 to its normal or zero position which opens the off-normal switch 398 and closes an off-normal switch 401. As shown, the off-normal switch 401 on the hundreds switch 265, which is closed when the switch 265 is in a normal position, is serially connected with a similar off-normal switch 402 on the tens switch 266 and a similar off-normal switch 403 on the units switch 267. These latter three switches 401, 402 and 403 are connected through a diode 404 to the reset input of the accumulator 30 and are used to couple the reset voltage to a similar reset input of the A station minute accumulator 31 when the HUT accumulator has been reset. Similarly, the A minute accumulator is provided with an output which is connected to the reset input of the B station accumulator thereby to cause the B minute accumulator to be reset upon completion of the resetting of the A minute accumulator. When the B minute accumulator has been reset, the reset voltage from the first bank of the switch 315 is connected through the rectifier 404 and the plurality of off-normal contacts in the A and B minute accumulators to the stepping solenoid 316 through the third bank of the switch 315.

When the stepping switch 315 advances to the twelfth position, positive battery is connected through the first bank thereof and the conductor 405 to the thirteenth contact segment of the first bank of switch 358. Inasmuch as the wiper of the switch 358 is at this time in the thirteenth position, this voltage is coupled to the stepping contacts 361 of the solenoid 362 thereby stepping the switch 358 to the fourteenth position. The remainder of the contact segments of the first bank of the switch 358 are connected to the battery terminal 363 so that the switch 358 thereafter self-steps to its normal or zero position. In addition to setting the switch 358 into self-stepping operation, the positioning of the switch 315 in the twelfth contact position supplies a voltage via the first bank thereof and the conductor 405 to the relay 350 thereby to close the normally open contacts 351 thereof and to couple A.C. voltage to the wiper of the second bank of the stepping switch 358. As the switch 358 steps from the fourteenth to its normal or first contact position, the wiper in the second bank first engages the fourteenth contact segment and connects the A.C. potential via a conductor 407 to the wiper of the second bank of a stepping switch 408 in the timer 42. The switch 408 is the tens section of a quarter hour indicator timing unit which, as described in greater detail hereinafter, is provided with one input pulse for every fifteen closures of the principal timer switch 304. The second bank of the switch 408 is the read-out section and the contacts thereof are respectively connected to the corresponding input terminals of the first digit column of the printer 40 so that a tens digit number is stored in the first digit position of the printer at this time. The switch 358 then self-steps to the fifteenth position so as to supply the A.C. voltage via a conductor 410 to the wiper of the third and read-out bank of the quarter hour units stepping switch 329. As the switch 358 continues to self-step to its normal position, the hundreds, tens, and the units sections of the C-minute accumulator 33 are scanned. Thereafter, the hundreds, tens, and units digits of the D-minute accumulator 34 are scanned, and this information is supplied to the printer 40 and stored thereby. When the switch 358 reaches the twenty-second position, a print signal is supplied from the terminal 372 through the wiper of the fourth bank of the switch 358 to the print order relay 373 causing it to operate thereby closing its normally open contacts 372 which connect the A.C. voltage to the print solenoid 375. The printer 40 thus operates to print the information which had previously been stored therein and to close the contacts 376 at the completion of the printing cycle. This supplies a positive voltage to the conductor 378 which is connected to the twelfth contact segment of the third bank of the switch 315 and thus through the wiper thereof to the normally open contacts 318, and then to the stepping solenoid 316 of the switch 315. This advances the switch 315 to the thirteenth contact position wherein a reset voltage is sent via the first bank of the switch 315 to the reset input terminal of the network C minute accumulator. As was described in connection with the HUT minute accumulator 30, the reset voltage is supplied through a set of normally closed off-normal contacts of the unit section of the C minute accumulator which, when completely reset, connects the reset voltage to the D minute accumulator to cause it to be reset. When both of these accumulators are reset, the reset voltage is connected through normally closed off-normal contacts of the C and D minute accumulators to the thirteenth off-normal contact of the third bank of the switch 315 and thus to the stepping solenoid 316 which advances the switch 315 to the fourteenth off-normal position. The fourteenth off-normal contact in the first bank of the switch 315 is connected to the relay 350 which is thus energized and causes the printer 42 to space one row since the input terminals thereof had not been energized since the last print order. As best shown in FIG. 14, this blank row or space separates the information pertaining to consecutive minutes and facilitates transcribing of the information from the printed record. After spacing, the contacts 376 in the printer 40 are closed and connect the voltage from the terminal 377 via the conductor 378 to the fourteenth contact segment of the third bank of the switch 315 and thence through the normally open contacts 318 to the solenoid 316 thereby stepping the switch 315 to the sixteenth position. The remaining contact segments of the third bank of the switch 315 are connected to a positive battery terminal 415 so that the switch 315 self-steps to the zero position, wherein it stops and is ready for recycling at the beginning of the next succeeding minute.

The above-described cycle of operation is repeated for each of the first fourteen minutes of each quarter hour of the day except during the "recall for base count check" period when the receiver attachments 21 are tested.

*Operation During Fifteenth Minute of the Quarter Hour*

During the fifteenth minute home scan period of each quarter hour, the operation of the central office equipment for printing the one-minute totals is substantially the same as that described above for each of the first fourteen minutes except that the relay 319 is released by the second bank of the stepping switch 310, and thus transfers the sequence control of the scan, accumulation and print cycles from the first and third banks of the switch 315 to the second and fourth banks thereof. Since the first fifteen contact segments of the second and fourth banks of the switch 315 are wired the same as the first and third banks thereof, the initial operation of the system during the fifteenth minute is essentially identical to that during any other minute, as described above. Accordingly, the homes are scanned and the usual one-minute totals are printed while the switch 315 is being stepped through its first fifteen positions. When, however, the switch 315 steps to the fifteenth position during the fifteenth minute, it does not self-step to its normal or zero position as is the case during the first fourteen minutes of each quarter hour since the contacts 318 on the relay 319 are now open. Accordingly, the switch 315 stops in the fifteenth position during the fifteenth minute of each quarter hour of the day.

With the switch 315 in the fifteenth contact position, positive battery is connected through the second bank thereof and a diode 425 to the first contact of the first bank of the stepping switch 358 thereby to energize the stepping solenoid 362 thereof through the stepping contacts 361. This steps the switch 358 to the first off-normal contact position and thereafter the switch 358 self-steps through all positions to the normal position by virtue of the fact that all contacts but the normal or zero contact and the thirteenth contact in the first bank of the switch 358 are connected to the voltage terminal 363. The fifteenth contact in the second bank of the switch 315 also supplies voltage to the coil of a relay 420 (FIG. 8) to close a set of normally open contacts 421 thereof which then supply A.C. voltage from the A.C. terminal AC1 to the wiper of the third bank of the switch 358. As the switch 358 steps through the first twelve off-normal positions, the third bank thereof controls the sequential connection of the time, HUT, station A, and station B fifteen-minute accumulation voltages to the printer 40 in the same manner as the corresponding one-minute accumulation voltages were supplied to the printer. When the switch 358 steps to the thirteenth position, the print order relay 373 is energized through the fourth bank of the switch 358 thereby to effect the printing of the time, HUT, station A, and station B fifteen-minute accumulations. The printer 40, upon completion of the print cycle, closes the switch 376 therein which couples voltage from the terminal 377 to the conductor 378 and thus to the stepping solenoid 316 of the switch 315 through a circuit which extends from the switch 376 to the wiper of the fifth bank of the switch 358 and thence through the thirteenth contact thereof to the fifteenth contact of the fourth bank of the switch 315 and through a set of normally closed contacts 417 of the relay 319 to the stepping contacts 317 of the switch 315. This steps the switch 315 to the sixteenth contact position which operates through the second bank thereof to supply a reset voltage to the HUT, station A, and station B fifteen-minute accumulators. These three fifteen-minute accumulators are reset in the same manner as the minute accumulators were reset, and when they have all been reset the positive reset voltage is supplied through the series connection of the off-normal contacts of the HUT, station A, and station B fifteen-minute accumulators, through a conductor 423, the fourth bank of the switch 315 and the normally closed contacts 417 to the stepping contacts 317 of the stepping solenoid 316. The switch 315 is thus stepped to the seventeenth contact position. The second bank of the switch 315 then connects positive battery to the relay 420 which thereby closes the contacts 421 thereof and supplies A.C. voltage to the wiper of the third bank of the switch 358. The second bank of the switch 315 at this same time also connects positive battery through the rectifier 425 to the thirteenth contact in bank one of switch 358 thereby to operate the stepping solenoid 362 and step the switch 358 to the fourteenth contact position. Since this contact and the remaining contacts are all connected to the positive battery terminal 363, the switch 358 thereafter self-steps to its first or normal position.

When the switch 358 is in the fourteenth position, a signal representing the tens digit of the quarter hour is supplied from the second bank of the switch 408 to the printer 40 and when the switch 358 steps to the fifteenth position the units digit of the quarter hour from the fourth bank of the switch 329 is supplied to the printer 40. The switch 358 thereafter continues to step to its normal position and as it steps through the next six contact positions it selectively connects the read-out switches of the station C and station D fifteen-minute accumulators to the printer 40. In the twenty-second contact position, the fourth bank of the switch 358 connects positive battery from the terminal 372 to the print order relay 373 which thus operates and supplies A.C. voltage through its normally open contacts 374 to the printer solenoid 375 whereby the quarter hour, station C and station D data are printed.

At the completion of the print cycle the contacts 376 in the printer 40 close to step the switch 315 to the eighteenth contact position. The circuit for energizing the solenoid 316 is from the voltage terminal 377, the contacts 376, through the fifth bank of the switch 358, through the fourth bank of the switch 315, and through the contacts 417 to the solenoid 316.

When the switch 315 steps to the eighteenth position, a reset voltage is supplied through the second bank thereof to the station C and station D fifteen-minute accumulators. When these accumulators have been reset and the off-normal contacts thereof are thus closed, the reset voltage is connected through a conductor 424 to the eighteenth contact of the fourth bank of the switch 315 and thus through the normally closed contacts 417 of the relay 319 to the stepping solenoid 316. This steps the switch 315 to the nineteenth contact position which operates through the second bank thereof to cause the printer to space one row. After spacing, the switch 376 closes and steps the switch 315 to the twentieth off-normal contact position. The twentieth, twenty-second, twenty-third and twenty-fourth contacts of the fourth bank of the switch 315 are connected to a positive battery terminal thereby to self-step the switch 315 to its twenty-fifth position. As the switch 315 steps through the twentieth to the twenty-third contact position, it selectively operates a plurality of relays 430, 434, 436 and 438. In the twentieth position, the second bank of the switch 315 effects operation of the relay 438 thereby to connect an AC1 terminal 433 to the wiper of a stepping switch 439 which energizes either the number one or number nine terminal of the eighth digit column of the printer 40. When the switch 315 steps to the twenty-first contact position, the relay 436 is operated which connects A.C. voltage from the terminal 433 to the wiper of a stepping switch 437 which connects this voltage to either the number one or number nine terminal of the ninth digit column of the printer 40. When the switch 315 steps to the twenty-second contact position, the relay 434 is operated which energizes the wiper of a stepping switch 435 which connects the voltage to either the number one or number nine terminal of the tenth digit column of the printer 40. When the switch 315 steps to the twenty-third position, the relay 430 is operated which energizes the wiper of a stepping switch 432 which energizes either the number one or number nine terminal of the eleventh digit column of the printer 40. The switch 315 then steps to the twenty-fourth position and functions, through the second bank thereof, to energize the print order relay 373. The print solenoid 375 of the printer 40 is thus energized and the latter four digits of network or program source information which were previously supplied to and stored by the printer 40 are printed.

While the printer is printing the network program information, the switch 315 self-steps from the twenty-fourth contact position to the twenty-fifth contact position and stops, and the second bank of the switch 315 supplies a reset voltage through a conductor 443 to the off-normal reset contacts of the switches 432, 435, 437 and 438. When all of these switches have been reset to zero, the reset voltage is applied therefrom via a conductor 444 to the twenty-fifth contact position of the fourth bank of the switch 315 thereby to step the switch 315 to its zero or normal position. In the normal position, the second bank of the switch 315 supplies a voltage to the print relay 373 which thus causes the printer to space one row because no data has been supplied to the input of the printer 40 since the last printing operation. No further operation of the system then takes place until the master timer switch 304 closes at the beginning of the next minute, at which time the system commences operating in the manner described hereinbefore for each of the first fourteen minutes of a quarter hour.

*Timer*

As previously indicated, the switch 310 advances one position every minute of the day so as to provide the time correspondence data for the record. The first nine contacts of the fifth bank of the switch 310 are respectively connected to the first through nine input terminals of the second digit column of the printer 40, and the tenth through fifteenth contacts of the fourth segment of the switch 310 are connected to the first terminal of the first digit column of the printer 40. In addition, the eleventh through the fifteenth contacts of the fifth bank of the switch 310 are respectively connected to the first through fifth contacts of the fifth bank so that when the switch 310 is in the eleventh through the fifteenth positions the first through fifth terminals of the second digit column of the printer are energized. The sixteenth through twentieth contacts of the first bank of the switch 310 are connected to the stepping contact of the stepping solenoid 308 for the switch 310, and inasmuch as the wiper of the first switch bank is connected to the positive battery terminal 327, once the switch 310 has been stepped to the sixteenth contact position it self-steps to the normal position. Consequently, the signal voltages provided on the read-out terminals of the fourth and fifth banks of the switch 310 indicate the particular minute in question of each quarter hour of the day.

In order to provide time correspondence data as a function of each quarter hour of the day, a quarter hour timer including the switches 408 and 329 is supplied with a stepping pulse from the switch 310 every fifteenth minute of the day. At the end of the final minute of each quarter hour, the switch 310 stands in its fifteenth contact position, and the solenoid 308 for the switch 310 is energized to prepare the switch 310 to advance to its sixteenth position. The energization of the solenoid 308 closes a pair of contacts 308*a* so that a stepping solenoid 446 for the switch 329 is operated by a potential forwarded from the terminal 327 through the second bank of the switch 310 and the closed contacts 308*a*. Therefore, the switch 329 is advanced one position for each fifteen minutes of the day and thus provides a units indication of the particular quarter hour in question. Furthermore, when the wipers of the switch 329 have been stepped to their ninth contacts and the solenoid 446 is next operated to close a pair of contacts 447 at the start of the tenth quarter hour, a stepping solenoid 431 for the tens quarter hour stepping switch 408 is actuated over a circuit extending through the second bank of the switch 329, a set of normally closed contacts 448 on a relay 449, and the closed contacts 447 controlled by the stepping solenoid 446. The other side of the winding of the solenoid 431 is connected to negative battery through the closed contacts 311 on the relay 307. The relay 449 is operated by the signal provided by the second bank of the switch 329 to open the contacts 448 and release the solenoid 431. The switch 408 thus provides a tens digit indication of the quarter hour.

*Automatic Error Detection and Indication*

Since the switch 315 controls the sequence of operation of the entire system, and since its stepping through its various control positions depends upon the proper operation of many of the other components in the system, it is conceivable that some one of the elements in the various energizing circuits of the stepping solenoid 316 may fail and thus result in the switch 315 becoming stopped in some particular position. In view of the fact that the system of the present invention is designed for fully automatic operation, unattended, it is important that in the event of such a failure means be provided for returning the system to operation and providing on the record an indication of the time of the failure thus indicating that the ratings printed on the record at the time in question are probably erroneous.

Therefore, in order to detect any failure of the switch 315 to properly step through its various control positions, an error detecting circuit including the sixth switching bank of the switch 315 is provided. When the system is operating properly, the wipers of the switch 315 dwell in the contact positions 1, 2, 4, 6, 8, and 10 through 24 for periods no greater than a few seconds. Therefore, there is provided in accordance with an important aspect of the present invention means for detecting the presence of the wipers of the switch 315 in any of these positions for a period of four seconds or more. When a prolonged dwell period of four seconds occurs, an indication is printed by the printer 40 of the particular contact segment of the switch 315 where the wiper dwelled, and a stepping voltage is supplied to the stepping solenoid 316 to advance the switch 315 to its next position from which it should step in the normal manner to its normal zero position.

Considered in greater detail, the error detecting and indicating circuit of the present invention comprises a plurality of relays 450, 451, 452, 453 and 454. Assuming that the switch 315 is in one of the heretofore recited positions, the wiper of the sixth bank of switch 315, which is energized through a set of normally closed contacts 456 associated with the stepping solenoid 316, energizes the engaged contact segment which is connected through a conductor 457 to the winding of the relay 450. The relay 450 is thus operated and connects this voltage through its set of normally open contacts 459 and a resistor 460 to the coil of the relay 454. The relay 454 does not immediately operate, however, because of a time delay capacitor 462 which is connected directly across the coil thereof and which must be charged before the relay 454 can be operated. This capacitor charges through the resistor 460 and, therefore, the relative values of the resistor 460 and the capacitor 462 as well as the voltage on the terminal 463 from which they are energized determines the time delay required for operating the relay 454. In the system of the present invention the value of the capacitor 462 was chosen to be 200 microfarads and that of the resistor 33 kilohms so as to provide a four-second time delay. It may thus be seen that if the wipers of the switch 315 dwell at any of the contact positions in question for four seconds or more, the relay 454 is operated. When the relay 454 operates, it connects a positive battery voltage through a set of normally open contacts 465 thereof to the coil of the relay 452 to operate it. The relay 452 is provided with two sets of normally open A.C. power contacts 467 and 468 which respectively energize the wipers of the seventh and eighth banks of the switch 315. As shown, the contacts of the seventh bank of the switch 315 are connected to respective ones of the terminals of the tenth digit column of the printer 40 and the contacts of the eighth bank are connected to respective ones of the terminals of the eleventh digit column of the printer 40. The tenth and eleventh digit columns of the printer 40 are thus energized to indicate the particular position of the switch 315 when it stops for more than four seconds. At the same time that the printer digit input terminals are energized, a set of normally open contacts 470 of the relay 452 connect a positive voltage to the coil of the print relay 373 thereby to energize the solenoid 375 of the printer 40 to cause it to print the information which is being supplied thereto from the seventh and eighth banks of the stepping switch 315. The contacts 470 also connect the positive battery voltage to the coil of the relay 453 which is thus operated and connects a positive voltage through a set of normally open contacts 471 to the stepping solenoid 316 of the switch 315 to cause it to step to the next contact position.

During normal operation, the switch 315 dwells in the contact positions 3, 5, 7, 9 and 25 for a substantially longer time than it dwells at the other contact position and, therefore, in order to insure the detection of any abnormalities in the operation of the system, these latter contacts are connected to a separate time delay control circuit which is operated only after the switch has been stopped in these latter positions for at least ten seconds. When the switch is in one of these latter positions, the contacts of the sixth bank of the switch 315 are connected through a conductor 473 to simultaneously operate the relays 450 and 451. A diode 475 is connected between the conductors 457 and 473 so as to prevent actuation of the relay 451 by a voltage which is supplied to the conductor 457 when the switch 315 is in any of the contact positions other than the third, fifth, seventh, ninth or twenty-fifth. When the relay 451 operates, a set of normally closed contacts 476 thereof open and connect a time delay capacitor 477 through a set of normally open contacts 478 on the relay 451 in parallel with the time delay capacitor 462. Accordingly, the time period which must elapse before the relay 454 can operate is appreciably extended. In order to provide a ten-second time delay, the capacitor 477 was chosen to have a value of 500 microfarads.

*Base Count Via Recall*

In order to provide an accurate record of the base count of the sample during each day, and moreover to prevent the transmission of erroneous information from the individual receiver attachments 21 to the classifying units and accumulators, the receiver attachments 21 are checked once each day to determine if they are operating properly, and in the event that any of them are not operating properly, its output signal is interrupted before it reaches the classifying unit so that no erroneous information therefrom is used in calculating the fast ratings. While it is within the scope of the present invention to provide a system wherein the operation of the receiver attachments is periodically checked more or less frequently than once each day, it has been found that a daily check of the equipment provides extremely accurate results and, therefore, the present system has been designed to check each of the receiver attachments 21 once each day.

Considering the base count via recall circuit in greater detail, a plurality of line reject relays 480–482 are respectively associated with each of the three telephone line pairs L1, L2 shown as coming into the central office, and it will be understood that there are similar line reject relays provided for each of the other line pairs terminating at the central office. The line reject relays 480–482 each include a set of normally open contacts respectively designated 484, 485 and 486 which are connected directly across the terminating impedances 152 of the associated line pair L1, L2 so that when a line reject relay is operated the associated line pair L1, L2 is shorted out and no signal therefrom is supplied to the home scan switch 154. The line reject relays 480, 481 and 482 are respectively operated if an inoperative receiver attachment 21 is detected during the time that the associated receiver attachments 21 are checked. Any of the line reject relays 480–482 which are thus operated are held closed until the next base count check is made on the following day.

At a given time each day, which in the illustrated embodiment of the invention is at the beginning of the fifth quarter hour of the day, or at 1:00 A.M. when the switch 329 is first moved to the fifth contact position and the switch 408 is still in the zero contact position, a relay 500 is operated through the first bank of the switch 408 and the second bank of the switch 329 thereby to open a set of normally closed contacts 501 thereof to disconnect the positive terminal of a battery 502 from a plurality of respective sets of normally open holding contacts 503, 504 and 505 on the line reject relays 480–482. The battery 502 is provided for holding the line reject relays 480–482 in a closed position when they are closed during the receiver attachment check and to maintain them closed throughout the following day. A.C. power is not used for this purpose since the relays 480–482 would be released in the event of a power failure and erroneous information would be printed.

Just before the periodic check of the receiver attachments 21 is to be made, the battery 502 is disconnected from the line reject relays 480–482 so as to release them to enable the testing of all the receiver attachments 21 in the system irrespective of their condition of operation on the preceding day. At the beginning of the following quarter hour when the switch 329 steps to the sixth contact position, a voltage is supplied through the second bank thereof to the coil of the relay 323 which operates and opens a set of normally open contacts **505*a* which removes the negative battery from the conductor 278 and thus from the accumulators 30–39 and the sequence control solenoid 316. Accordingly, neither the sequence controller nor any of the accumulators can operate during the following fifteen-minute period while all of the receiver attachments 21 in the system are being checked. However, the timing switches 310, 408 and 411** continue to operate to maintain an accurate time record.

Operation of the relay 323 energizes a motor 506 through a set of normally open contacts 507. The motor 506 is a $\frac{1}{10}$ r.p.m. motor which drives a switch actuating arm 508 for sequentially operating a plurality of normally open switches 509, 510, 511, 512, 513 and 514. The switch actuating member is shown in its zero or normal position where it rests during normal operation of the system. Therefore, when the motor 506 is first operated, it rotates the actuating arm clockwise and first closes the contacts 513. These contacts operate the relay 186 which closes two sets of normally open contacts 516 and 517 thereof to respectively connect voltage from a battery 518 to the wipers of the first and third switching banks of the home scan switch 154. At this same time a relay 520 is operated through the switch contacts 513 and through a diode 521 to close a set of normally open contacts 522 thereof. The contacts 522 thus connect a positive voltage to the contacts 333 of the stepping solenoid 328 of the home scan switch 154. The switch 154 therefore steps to the first off-normal position and thereafter self-steps through all of its positions back to its normal or zero position. As the home scan switch steps through its off-normal contact positions, it sequentially connects the battery 518 across the sets of telephone line pairs L1, L2 thereby to impress a call-back initiation voltage on each of the line pairs. As described above in connection with FIG. 2, this call-back initiation voltage signal operates through the transistor input circuits of the receiver attachments 21 to commence the call-back operations thereof.

The motor 506 continues to operate and shortly after the initiating signals have been transmitted to all of the attachments 21 it permits the contacts 513 to open and closes the contacts 514 thereby to maintain the relay 520 operated and to release the relay 186. The switch 154 has previously self-stepped to its zero or normal position having initiated the recall operation in each of the receiver attachments 21, and, therefore, when the switch contacts 514 are closed, the switch 154 is again self-stepped through all twenty-five of its off-normal contact positions.

The timer motors 120 in the receiver attachments 21 rotate in substantial synchronism with the timer motor 506 at the central office so that all of the attachments 21 in the system send out a "station A" identification voltage signal while the switch contacts 514 are closed, a "station B" identification voltage signal when the switch contacts 509 are closed, a "station C" identification voltage signal when the switch contacts 510 are closed, a "station D" identification voltage signal when the switch contacts 511 are closed, and an "HUT" identification signal when the contacts 512 are closed. Each of the line pairs L1, L2 is scanned while the respective switch contacts 514, 509–512 are closed so that the station identification signals and the HUT signals from all of the attachments are selectively connected in groups to the classifying thyratrons 155–159.

Considering in detail this portion of the system while the switch contacts 514 are closed, the line pairs L1, L2 are first selectively scanned to check the "station A" identification voltages therefrom, and the associated line reject relays 480–482 are adapted to be operated through the fifth bank of the switch 154 in the event the conductor 161 is not simultaneously energized. With the contacts 514 closed, a relay 525 is operated through a set of normally open contacts 526 on the relay 323. If the line 161 is not energized, a relay 528 is dropped out and the wiper of the fifth bank of the switch 154 is energized through a set of contacts 529 thereof. The contacts of the fifth bank of the switch 154 are respectively connected to the line reject relays which correspond to the line pairs L1, L2 being simultaneously scanned. Consequently, if the line 161 is not energized, the line reject relay 480–482 corresponding to the home being scanned is operated. If, on the other hand, the line 161 is energized, the contacts 529 are open since the relay 528 is operated and the energization circuit to the line reject relays 480–482 is interrupted. Therefore, if the line 161 is energized during the A station scan of the receiver attachments 21, the line reject relays 480–482 are not operated; but should the line 161 not be energized when any one of the line pairs L1, L2 is being scanned, the associated line reject relay is operated to short-circuit the particular line. Assuming, for example, that when the first line pair L1, L2 which is associated with the line reject relay 40 is being scanned, the line 161 is not energized; therefore, the relay 523 is released so that when a set of normally open contacts 535 associated with the solenoid 228 are next closed at the time the solenoid 228 is next energized to step the switch 154, the wiper of the fifth section of the switch 154 is energized and the relay 480 is operated. The relay 480 is then held in the operated position by the set of normally open contacts 503 thereof until the relay 500 is next operated during the quarter hour preceding the next base count check. The home scan switch 158 continues to self-step and to operate the line reject relays associated with any of those receiver attachments 21 in which the conductor 161 is not energized at the proper time. When all of the homes have thus been checked for "station A" identification signals, the motor 506 has driven the actuator arm 508 so that the switch 514 is opened shortly thereafter. During the time that the switch 514 is open, a capacitor 523, which is connected between ground and the coil of the relay 520, discharges through the resistor which is connected thereacross so that when the contacts 509 are thereafter closed the relay 520 is again operated to initiate the stepping of the switch 154 to scan all of the homes in the sample. The closure of the switch contacts 509 also connects positive battery voltage to the coil of a relay 540 which operates and closes a set of normally open contacts 541 thereof so that if a relay 542 whose coil is connected between ground and the conductor 162 is not energized by a "station B" signal supplied from a line pair L1, L2, the corresponding contact segment of the fifth bank of the switch 154 energizes the coil of the corresponding line reject relay 480–482. The circuit for operating the line reject relay extends from the positive terminal of the battery 502 through the closed contacts 501 and 535, a pair of normally closed contacts 543 on the relay 542, and the closed contacts 541 to the wipers in the fifth bank of the switch 154. A similar set of relays 544 and 545 is provided for the checking of "station C" and for selectively operating selective ones of line reject relays 480–482 should the relay 545 not be operated during scanning of any of the homes, and another set of relays 547 and 548 are provided for selectively operating the line reject relays 480–482 during the "station D" check should the relay 548 not be energized Therefore, in the manner described in detail in connection with "station A," all of the receiver attachments 21 are sequentially checked for all of the four stations being monitored.

After all of the attachments 21 have thus been checked for all four stations, the contacts 511 are opened and the contacts 512 are closed to actuate a relay 550 (FIG. 12). This closes a set of normally open contacts 551 on the relay 550 and connects a positive voltage for selective switching by the thyratrons 155–159 to the conductors 160–164. Also, a set of normally open contacts 552 on the relay 550 are closed, which restores the negative battery voltage to the minute accumulators and the sequence controller. When the contacts 512 close, a positive voltage is also supplied to the coil of a relay 555. A capacitor 556 is serially connected between negative battery and the coil of the relay 555 so that the relay 555 is only momentarily energized when the switch 512 is closed. When, however, the relay 555 is actuated, a set of normally open contacts 557 thereof close which supply a positive voltage pulse to the conductor 324 thereby to initiate operation of the switch 315 so that a typical one-minute sequence of operation is initiated.

At this time, it will be remembered, all of the receiver attachments 21 are supplying an HUT voltage to their respective telephone lines L1, L2 so that as the home scan switch 154 scans each of the homes, the conductor 160 will be energized for each home whose line reject relay 480–482 had not been operated by virtue of an incorrect station identification signal having been previously supplied thereto during this recall check. Consequently, the number of operative homes in the sample at the end of the recheck period equals the number of HUT pulses which are supplied to the HUT minute accumulator during this one-minute sequence of operation of the system. Consequently, the HUT number which is printed by the printer 40 at this time is an accurate indication of the base count.

Because of the fact that the HUT voltages which are supplied to the line from the receiver attachments 21 constitute a portion of each of the station identification signals for the stations A, B, C and D, which were previously supplied to the line pairs by the attachments 21, if the HUT voltage for any attachment were of an improper value, then it is evident that at least one, and probably all, of the station identification signals coming from that particular receiver attachment 21 would be in error. Therefore, the line reject relay associated with that receiver attachment would be energized at this time. It is thus unnecessary to individually check the HUT voltages from the attachments 21, and the HUT voltages which are supplied therefrom are only used to provide a record of the base count for the sample during the succeeding twenty-four-hour period.

Shortly after the base count record has been made, the contacts 512 open to release the relay 550 and open the contacts 552 thereof, which disconnect the negative ground from the HUT minute accumulators and from the sequence controller. Shortly thereafter the base count check period terminates and the switch 329 steps to the seventh contact position thereby to release the relay 323 which deenergizes the motor 506 and restores the negative ground to the minute and fifteen-minute accumulators and to the sequence controller. The system is thus returned to normal operation and functions throughout the next twenty-four-hour period in the manner described above.

*Power Failure*

Should the power to the central office fail, the relay 307 releases, since its coil is connected directly across the power line, and closes two sets of normally closed contacts 560 and 561. These contacts connect a battery 562 into the timing circuit. A mechanical clock 563 having a set of contacts 564 which are closed at the same rate as are the contacts 304 is serially connected between the positive terminal of the battery 562 and the contacts 561 so that once each minute during a power failure the system is set into operation and the timing switches 310, 408 and 329 function under battery power in the normal manner. Although no information is printed during power failure because of the fact that the printer 40 is an A.C. operated unit, the timer switches 310, 408 and 329 do continue to operate from the battery 562 and thus maintain correct time records during the power failure so that when power is restored the time correspondence information which is thereafter printed is not erroneous.

*Program Analysis*

As described above in connection with the operation of the system of the present invention, during each fifteen minutes of the day there is printed, in addition to the usual time identification data and the HUT and station identification data, four figures which respectively indicate whether or not the four stations being monitored were carrying network programs during the preceding quarter hour. The four digits respectively relate to the four stations being monitored. A one indicates that the station was not carrying a network program, and a nine indicates that the station was carrying a network program.

As shown in FIG. 4, the switches 432, 435, 437 and 439 are identically wired, and the first ten contacts of each are connected together and to the number one terminal of one of the digit columns of the printer, and the eleventh through sixteenth contacts are connected together and to the ninth terminal of the same digit column of the printer. Once each minute the audio portion of the signal being transmitted by station A is compared with the audio signal which is being supplied to all of the corresponding network stations, and if the two audio signals are alike the switch 439 is stepped one position. Otherwise, the switch 439 is not stepped. Similarly, the audio components of the signals transmitted by stations B, C and D are compared once each minute with the audio signals of the corresponding networks B, C and D, and the switches 432, 435 and 437 are respectively stepped in the event the signals compared are alike.

It has been found that even though a station may be carrying the network program, there may be some local information periodically transmitted such, for example, as station identification signals, local advertising breaks, special news broadcasts, and the like. Consequently, even though a station may be carrying a network program, the transmitted signal and the network signal may differ throughout a substantial portion of each quarter hour. However, if a match occurs during ten of the fifteen minutes, then it is clear that the network program was carried and, for practical purposes, the station is considered to have been carrying the network program during the preceding fifteen-minute time interval. Had a match occurred for at least ten minutes during any quarter hour interval, the wiper of the switch 432, 435, 437, 439 corresponding to the station in question would be at least on the eleventh or tenth off-normal contact position at the end of the quarter hour in question and, therefore, would energize the ninth terminal of the associated digit column of the printer thereby to print on the fast rating record an indication that the station was carrying a network program. On the other hand, if the wiper has not moved to at least the tenth off-normal contact position, then a considerable amount of time during the preceding fifteen-minute interval was devoted to a locally produced program and the number one terminal of the same digit column would be energized thereby to indicate that the station was not carrying a network program during the preceding quarter hour.

Considering the circuitry of the present invention which once each minute compares the network programs with the locally transmitted programs to determine if they are the same, and which thus supplies the necessary stepping voltages to the switches 432, 435, 437 and 439 when the stations in question are carrying network programs, the audio portions of the network programs from networks A′, B′, C′ and D′, which are adapted to be carried by the local stations A, B, C and D, are respectively supplied to the central office via a plurality of line pairs 600, 601, 602 and 603. Similarly, a plurality of receivers 48, 49, 50, and 51 are provided for respectively receiving the signals which are actually transmitted by the stations A, B, C and D, and for applying the audio portions of these signals across respective sets of lines 610, 611, 612 and 613. The common ones of each of the line pairs 600–603 and 610–613 are connected together and to the common terminals of a pair of conventional bandpass filters 614 and 615. The filters 614 and 615 are conventional one-thousand cycle per second bandpass filters centered at one thousand cycles per second and having a bandwidth of approximately 150 cycles and an attenuation slope of approximately 40 db/octave. The other conductors of the line pairs 600–603 are respectively connected to the first four contact segments of the first switch bank of a stepping switch 617. The other conductors of the line pairs 610–613 are similarly connected to the first four contact segments of the second bank of the switch 617. The wiper of the first bank of the switch 617 is connected to the input of the bandpass filter 614, and the wiper of the second bank of the switch 617 is connected to the input of the bandpass filter 615. With the switch 617 in the first contact position, as shown, whereby the program actually being transmitted by station A is compared with the program being carried by network A′, the network A′ signal which is received on line 600 is coupled through the first bank of switch 617 to the bandpass filter 614. The output of the filter 614 is coupled via a transformer 620 to a potentiometer 621 from which it is coupled to a set of signal grids on a tube 622 which is connected in an amplification and compression circuit for amplifying compressing the signals which are supplied thereto. The resulting signal is coupled through a capacitor 623 to the signal grid of a triode amplifier 624, the output of which is coupled through a transformer 625 to a full-wave rectifier circuit including a double diode 626 from the output of which a rectified voltage signal is returned to provide a bias on the input grid for the amplifier tube 622. In this manner, the audio network A′ signal which is coupled through the transformer 620 is amplified and compressed so that level changes of 60 db at the input are compressed to 12 db at the output of the amplifier 622.

A portion of the output of the amplifier 622 is coupled via a conductor 628 to the signal grid of a triode amplifier 630, the output of which is coupled through a transformer 631 to a full-wave rectifier network including a double diode 632. The circuits comprising the tubes 622, 624, 626, 630 and 632 thus provide amplification, compression and integration to provide at the center tap of the secondary winding of the transformer 631 a rectified A.C. signal which has a value varying in accordance with the audio signal appearing between the lines 600. A similar circuit is provided at the output of the bandpass filter 615 so as to provide at the center tap of an output transformer 634 thereof a similar full-wave rectified D.C. voltage signal which varies in accordance with the audio component of the signal appearing at the output of the A station receiver 605.

The amplifier, the compression and integration circuit which extends from the input transformer 620 to the output transformer 631 and the identical circuit which is provided at the output of the bandpass filter 615 is substantially the same as that disclosed in FIG. 2 of a copending application, Serial No. 624,359, filed November 26, 1956, by Chauncey Richard Evans, and assigned to the same assignee as the present invention. A detailed analysis of the operation of this circuit is given in that application. However, for a complete understanding of the present invention it is only necessary to understand that when identical audio signals are supplied to the bandpass filters 614 and 615 the output signals appearing at the center taps of the secondary windings of the transformer 631 and 634 are identical, but opposite in polarity, while these signals are entirely different if different program signals are supplied to the filters 614 and 615. These signals are added together in the network comprising the capacitors 635 and 636 and the resistors 637, 638, 639 and 640 to provide at the junction of the resistors 637 and 640 a signal voltage which is substantially zero when the signals are identical but which has a relatively large value if the input signals to the filters 614 and 615 are not identical.

In order to convert this rectified voltage signal to an A.C. voltage, the 60-cycle power line is connected to the primary winding of a transformer 645 having a pair of rectifiers 646 connected back-to-back in series with a pair of resistors 647 and 648 across the secondary winding thereof. A balancing potentiometer 649 is also connected across this secondary winding and an adjustable tap thereon is connected to ground. The signal appearing at the junction of the resistors 637 and 640 is thus coupled through a resistor 650 and chopped by the diodes 646 to provide a 60-cycle signal having an amplitude corresponding to that of the sum of the voltages from the transformers 631 and 634. This A.C. voltage, which is a square wave, is coupled through a capacitor 651 to the control grid of a triode clipper 652, wherein it is clipped in a negative direction. The positive going voltage pulses are then coupled through a capacitor 653 to a second triode amplifier 654 wherein the signal is further amplified and coupled by means of a diode 656 to a monostable flip-flop circuit 661 comprising a pair of triodes 657 and 658. The flip-flop circuit 661 is conventional having a common cathode resistor 659 and a capacitor 660 connecting the anode of one triode to the control grid of the other. The output of the flip-flop circuit 661 is, therefore, a positive pulse which is coupled from the anode of the triode 658 to the signal grid of a pentode 665 which is part of a Miller integrator circuit having a time constant of approximately seven seconds such that match indications for short intervals of less than seven seconds are 100% integrated output. The integrated out signal from the Miller integrator is supplied to the signal grid of an amplifier 666 having a relay 667 connected in the anode circuit thereof. Accordingly, the relay 667 is operated whenever a match occurs. As shown, the relay 667 includes a set of normally open contacts 668 which are connected between a positive voltage terminal 670 and a set of normally open contacts 671 on the stepping solenoid 672 of the switch 617. The solenoid 672 is energized at this time in a manner to be described hereinafter whereby the contacts 671 are closed and thus couple the positive battery voltage from the terminal 670 to the wiper of the third bank of the switch 617 from which it is connected to the stepping solenoid 675 of the A station stepping switch 439. The switch 439 thus steps one contact position during each minute that a match occurs.

In order to check each of the four stations being monitored, there is provided a rotary type switch 680 having a wiper 681 driven by a 1 r.p.m. motor 682. The contacts of the switch 680 are all connected together and to the positive voltage side of the stepping solenoid 672 for the switch 617. The wiper 681 is connected to the positive voltage terminal 670 so that each time the wiper 681 steps between contact positions the voltage to the solenoid 682 is interrupted thereby permitting the switch 617 to step. When the wiper 681 engages the next contact segment, the voltage from the terminal 670 is again coupled to the solenoid 672 thereby to energize it and maintain the contacts 671 closed. The motor 682 is connected directly across the A.C. power lines and continues to operate throughout the day so that once each minute all four of the stations are checked to determine if they are carrying the network programs and to automatically print this information in conjunction with the fast ratings.

It is not necessary to phase the switches 617, 432, 435, 437 and 439 with the sequence control switch since the present system shows a match when there is ten minutes of match out of a total of fifteen minutes during each quarter hour.

Figure 3:
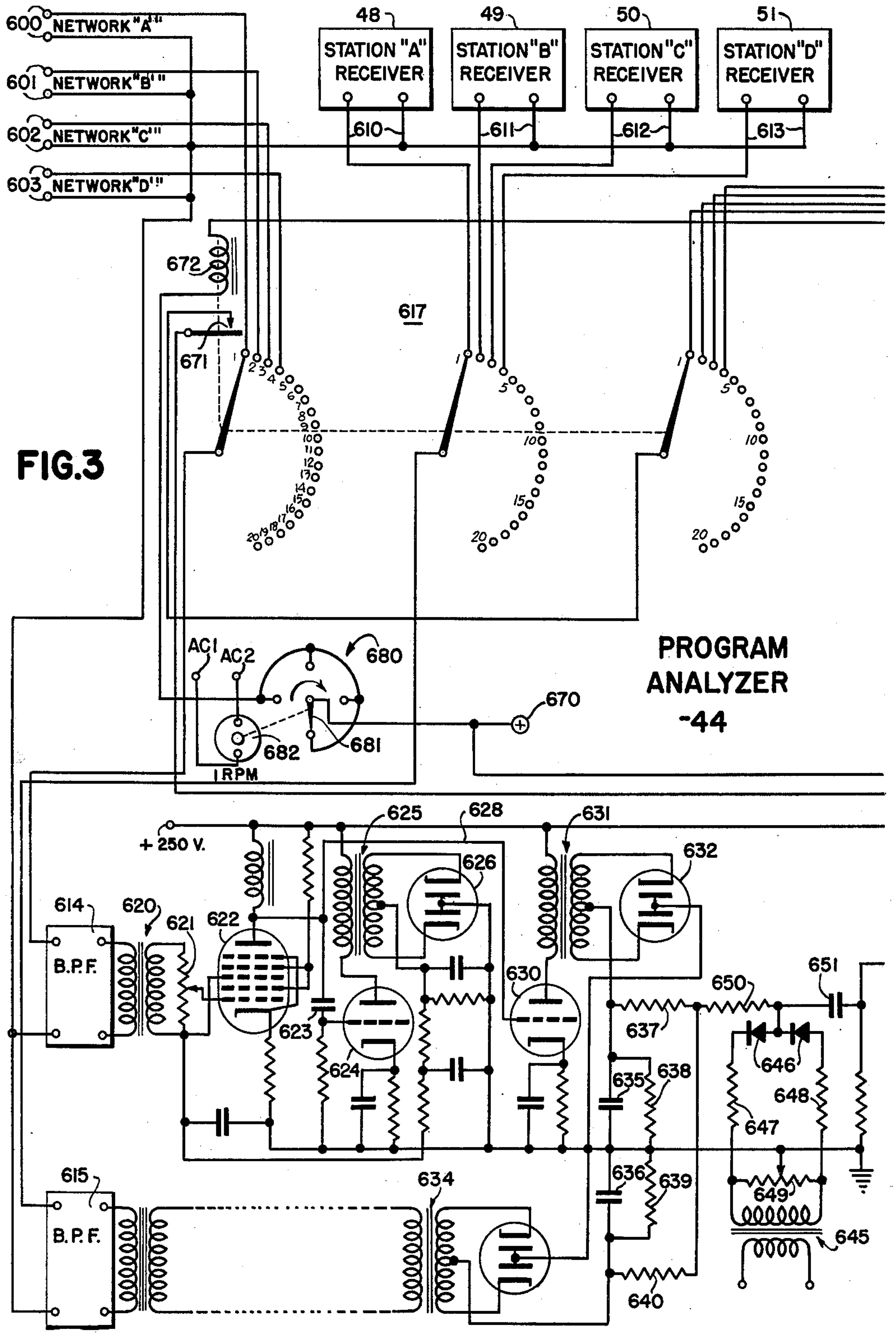
Figure 5:
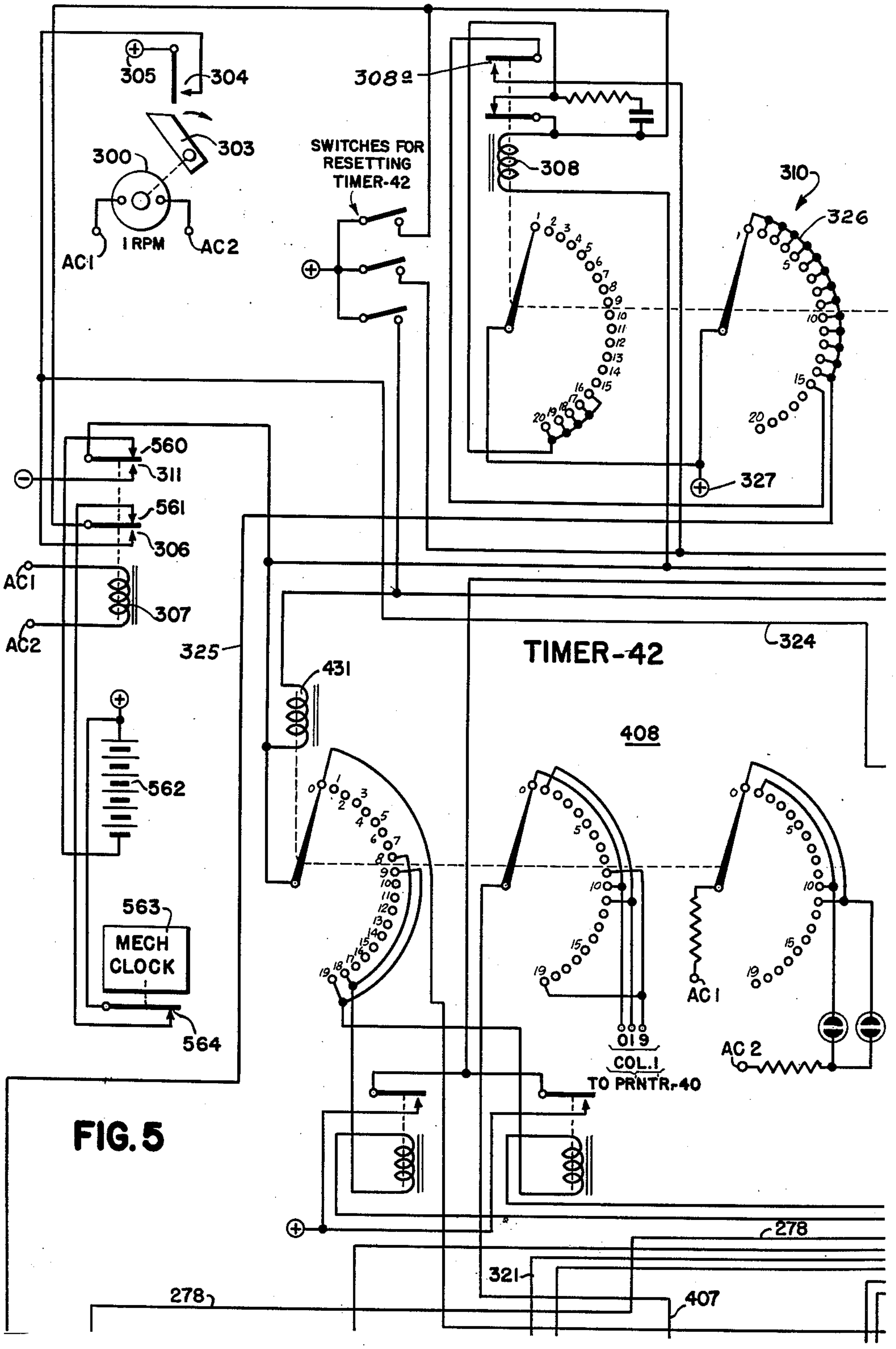
Figure 6:
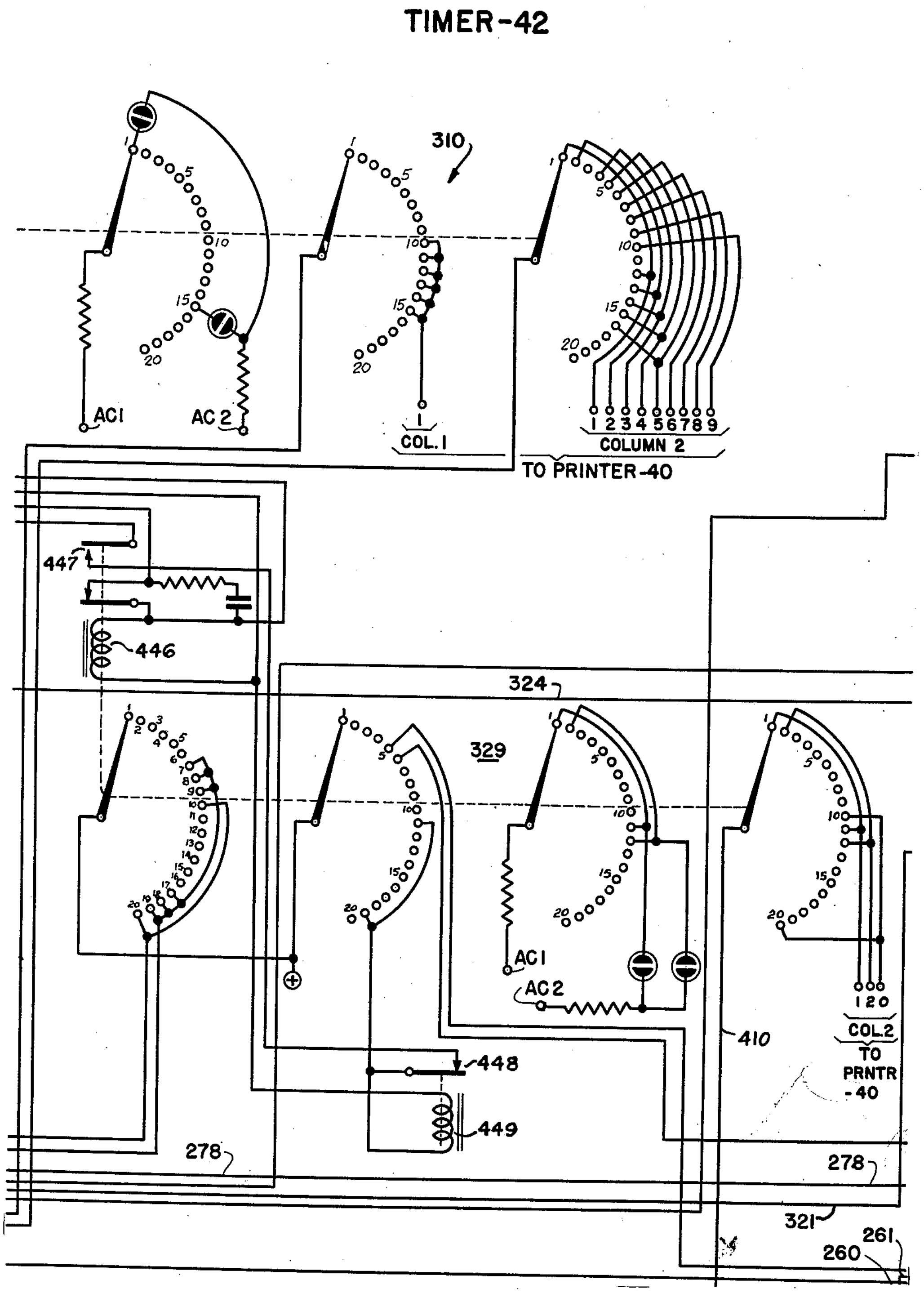
Figure 7:
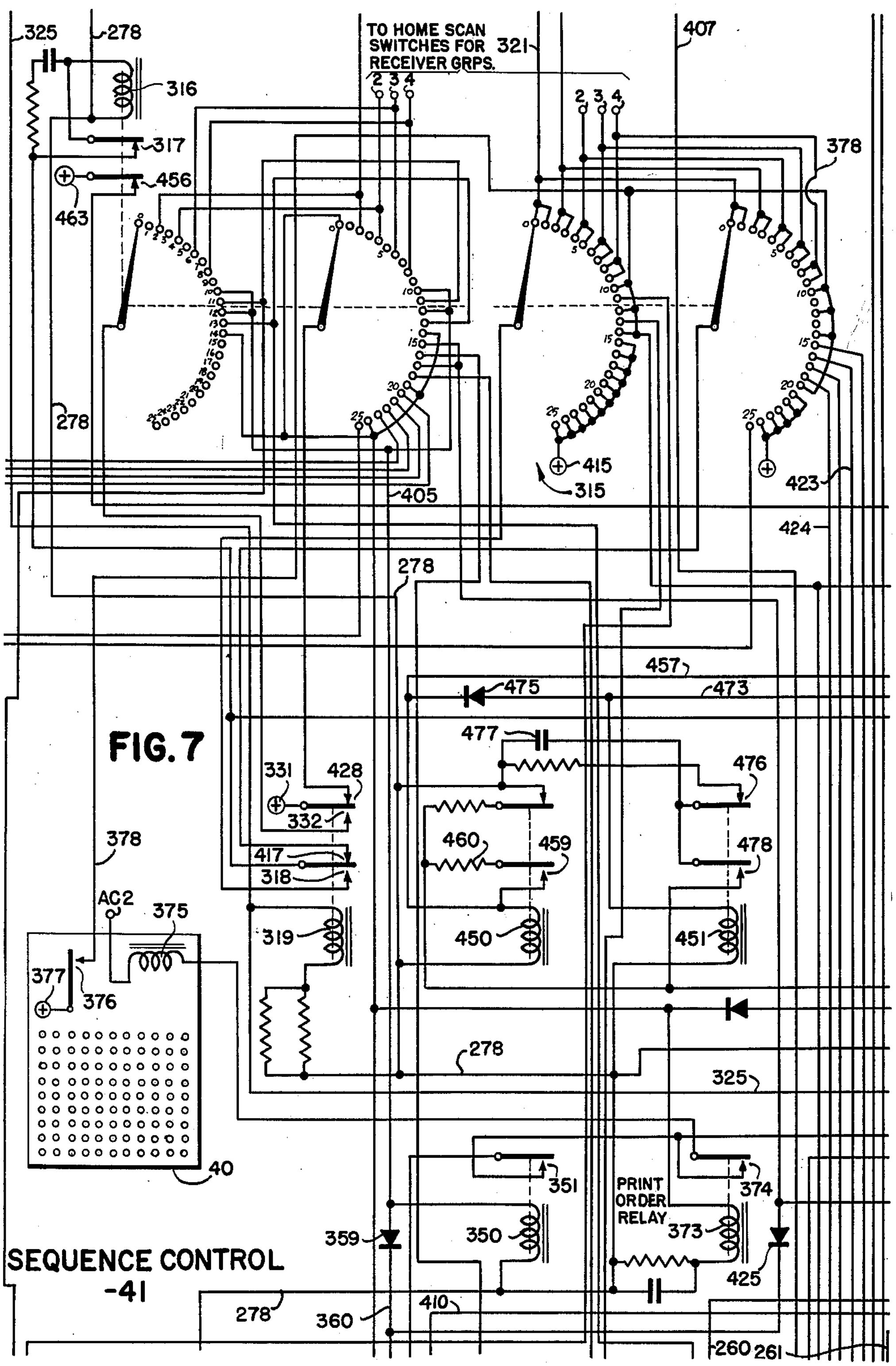
Figure 8:
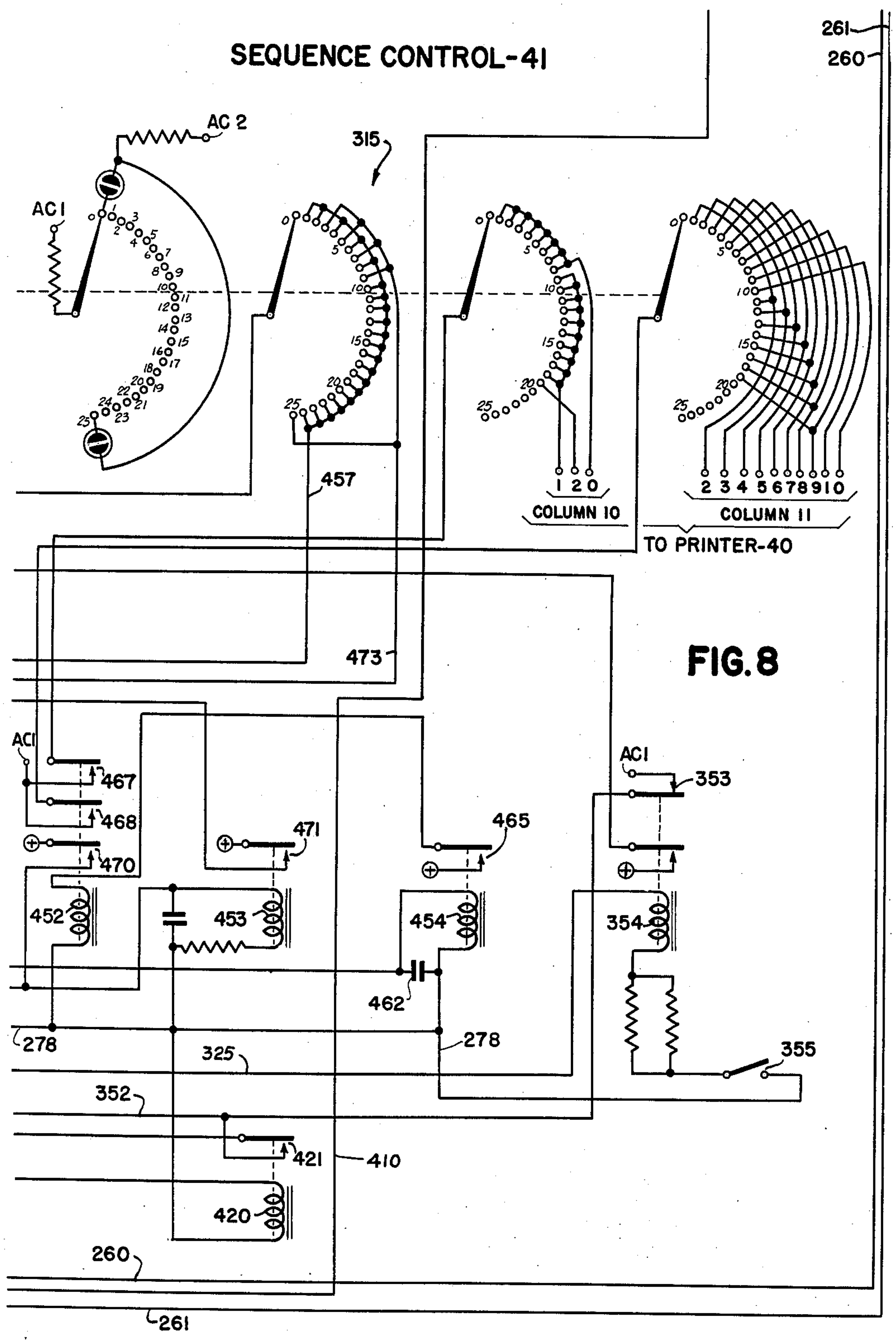

While the circuit of FIGS. 3 and 4 automatically provides a record for every quarter hour as to whether or not the stations being monitored were carrying network programs, other means may be provided for supplying this information to the printer.

Figure 15:
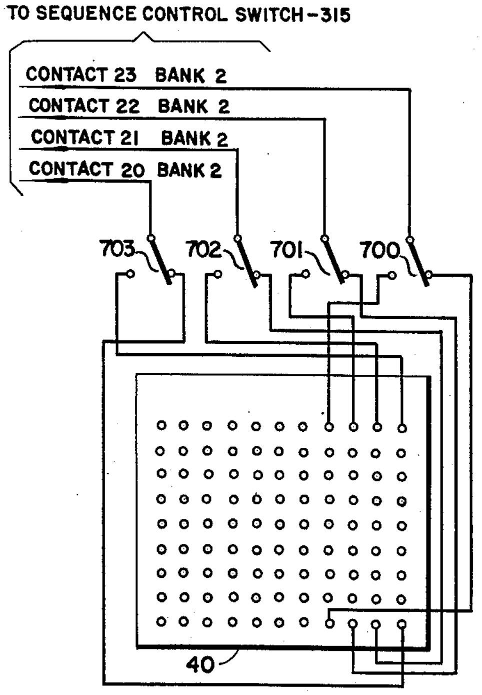
FIGS. 15, 16 and 17 are alternative embodiments of the program analyzer used in the system of the present invention.

Referring now to FIG. 15, there is shown a considerably simpler, manually operated switching network for supplying the program source information to the printer. In this arrangement a plurality of single pole, double-throw switches 700, 701, 702 and 703 replace the station A, B, C and D switches 439, 437, 435 and 432, and an operator replaces the comparison circuit portion of the audio matching system shown in FIGS. 3 and 4. In the circuit of FIG. 15, the four input lines to the switches and their associated components 432, 435, 437 and 439 from the sequence controller are respectively connected to the common poles of the switches 700, 701, 702 and 703, and the two output terminals to which each of the armatures may be thrown are respectively connected to the ninth and first terminals of respective ones of the last four digit columns of the printer. An operator for station A, for example, listens or watches the program which is being transmitted by the local station A, and also watches the program which is being piped in from the network A', and if the two programs are identical, he then actuates the switch corresponding to the station in question to the position shown so that when the sequence controller supplies the signal to the input line thereof it is supplied to the ninth terminal of the digit column in question. Similarly, the same or other operators will observe the other three stations and operate the switches 701, 702 and 703. Therefore, at the end of every quarter hour period when the four input lines to the circuit of FIG. 15 are sequentially energized by the switch 315, either the first or the ninth input terminals of the station and network match digits of the printer 40 will be energized for future printing of the program source information when the switch 315 steps to the twenty-fourth off-normal contact positions.

Figure 16:
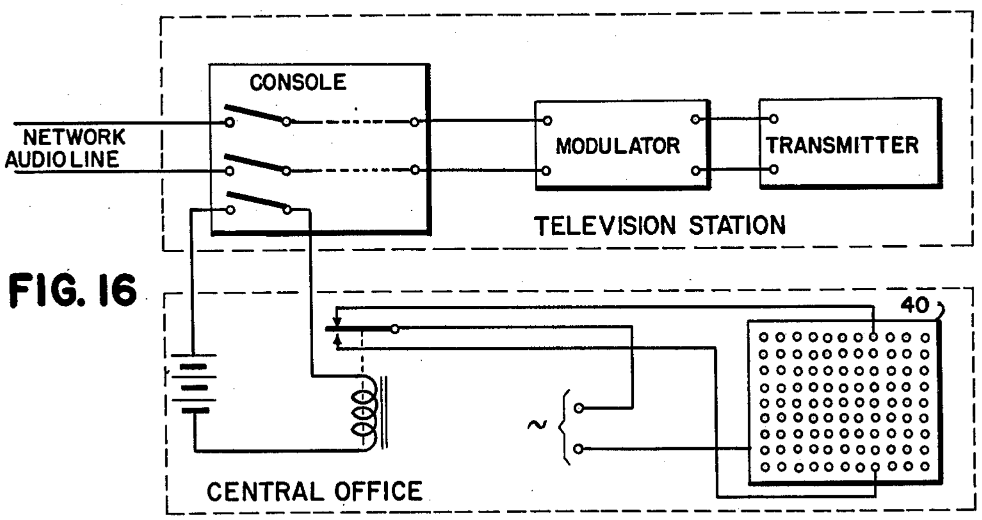

Another means for providing the program source information is to cause the switches 700, 701, 702 and 703 to be operated by respective electromagnetic windings whereby the switches 700–703 comprise contacts on four individual relays. The coils of these relays are serially connected to respective pairs of telegraph lines which are connected in a loop which further includes respective switches at the corresponding transmitter which are automatically closed when the switching equipment at the transmitter is actuated to couple the network program to the input stage of the transmitter. Referring to FIG. 16, there is shown a circuit for effecting this result. The circuit of FIG. 16 is a very simplified version of how the telegraph line would be completed during the transmission of a network program, and it will be understood that different stations may have different switching arrangements including multiple switching networks so that various types of switching arrangements may be necessary to complete the telegraph line circuit when, and only when, the station is carrying a network program. However, FIG. 16 is merely schematic and illustrates the manner in which those skilled in the art may employ the present invention to automatically provide at the central office information indicative of whether or not the local station is carrying a network program. Moreover, the circuit of FIG. 16 shows how this information may be automatically supplied to the fast rating printer, and it will be understood that a similar circuit will be provided for each network affiliated station being monitored.

Figure 17:
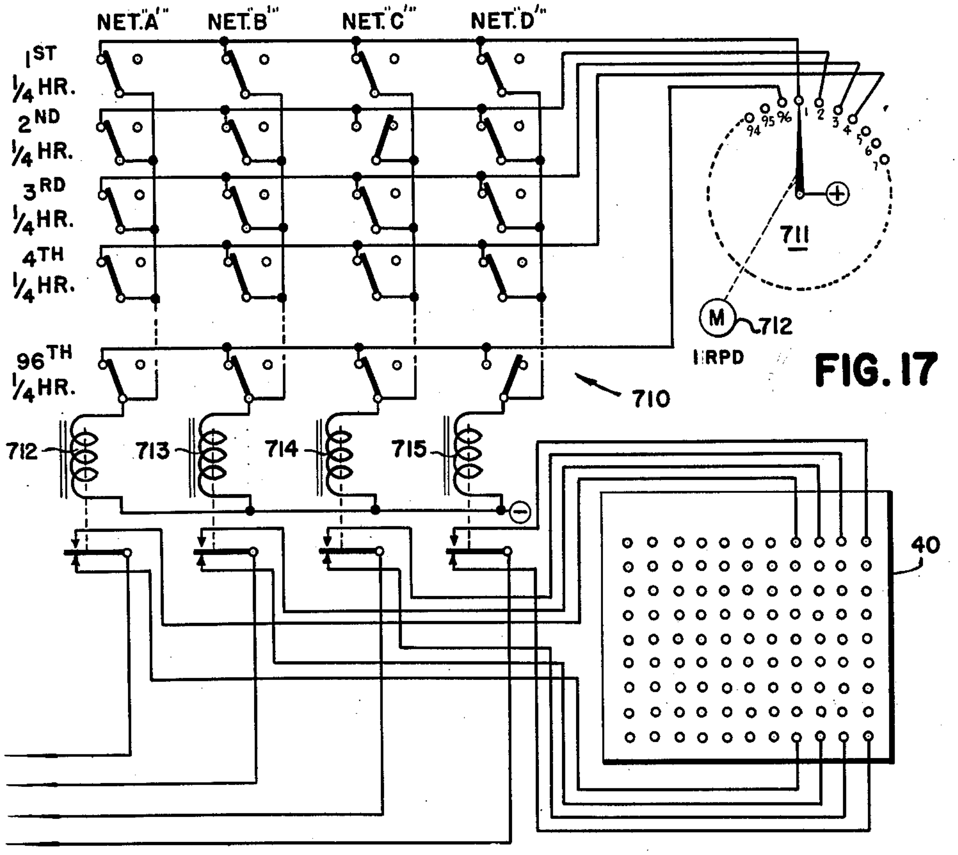

Referring to FIG. 17, there is shown still another alternative arrangement for supplying the program source information to the printer 40. In the circuit of FIG. 17, there is provided a matrix of manually operated switches 710 which are arranged in rows and columns. For example, the first row of switches are connected from a common conductor which is connected to the first contact of a ninety-six position stepping switch 711 which is driven by a motor at one revolution per day, and the wiper of the switch 711 is connected to a positive voltage terminal. The common contacts of all of the switches in each column are respectively connected to the coils of four relays 712, 713, 714 and 715, each having normally open and normally closed contacts which are connected respectively to the first and ninth terminals of four digit columns of the printer 40. The relays 712–714 thus have C-spring type contacts, and the four common contact members thereof are respectively connected to the twentieth through twenty-third contacts of the switch 315. The common contact members of the relays 712–715 are thus selectively energized at the end of each quarter hour to record whether or not the local stations were carrying network programs during the preceding quarter hour. The switches in the matrix 710 are manually positioned at the beginning of each day in accordance with the program information supplied to the central office from the local station. Therefore, for example, if station A were scheduled to carry a non-network program during the first quarter hour of the day, the switch which is in the first row of the first column of the matrix 710 would be positioned as shown, while if a network program were to be carried at that time this switch would be thrown to the other position. When this switch is in the non-network position, and it is the first quarter hour of the day, a positive voltage is supplied through the switch 711 and through the matrix bank 710 to the coil of the relay 712 thereby to energize it to close the normally open contacts thereof and connect the input conductor from the twenty-third contact of the second bank of the switch 315 to the first terminal of the eighth digit column of the printer 40. However, had this switch been in the other position, the network position, the relay 712 would not have been operated and, therefore, the signal voltage from the relay 712 would be connected to the ninth terminal of the eighth digit column of the printer 40 and a numeral nine would be printed when the printer 40 were energized.

That aspect of the present invention which concerns the recording of station acceptance data, i.e., whether the individual stations are broadcasting network programs, has been described as embodied in a particular monitoring system. However, this aspect of the invention may be used with other systems or in different arrangements in the illustrated system. For example, where network program listening is of particular interest, the output of the program analyzer 44 may be connected through the sequence controller 41 to the fast rating printer 40 so that the network program totals and the percentage of persons listening to all other programs are respectively printed. Moreover, this aspect of the invention may be used in a monitoring system where the listening information is stored in the receiver attachments and transmitted at periodic intervals to a central office. In the latter system the station acceptance information is, of course, needed at the central office when the ratings are computed, and it may be so provided by any of the devices disclosed hereinbefore for determining program acceptance.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. A system for monitoring the use of a plurality of wave signal receivers, comprising a plurality of receiver attachments respectively connected to said receivers, said receiver attachments including means for providing output signals indicative of the operating conditions of the associated receivers, a central office, means for transmitting said receiver operating condition signals from said attachments to said central office, means at said central office responsive to the receiver operating condition signals supplied thereto for totalizing the number of said receivers in each of a plurality of possible operating conditions and for periodically recording these totals, and checking means at said central office for transmitting signals to the receiver attachments to periodically check the operativeness of each of said receiver attachments to supply accurate operating condition signals to said central office, recorder means in said central office, and means controlled by said checking means for periodically supplying to said recorder means the number of operative receiver attachments connected in the system.

2. A system for monitoring the use of a plurality of wave signal receivers, comprising a plurality of receiver attachments respectively connected to said receivers for providing electrical signals indicative of the operating conditions of the associated receivers, a central office remotely disposed from said receiver attachments, signal link means interconnected between said attachments and said central office for supplying said receiver operating condition signals to said central office, recorder means in said central office, means at said central office responsive to said receiver operating condition signals for operating said recorder means to provide a record of the operating conditions of said receivers, testing means at said central office operative to control said receiver attachments over said signal link means for intermittently checking the operation of said attachments, and means controlled by said testing means for rendering said recorder means unresponsive to any of said receiver attachments which are not operating properly.

3. A system as set forth in claim 2 which further includes means controlled by said testing means for operating said recorder means to provide an indication of the number of receiver attachments providing output signals to which said recorder means is responsive.

4. A system for monitoring the use of a plurality of wave signal receivers, comprising a plurality of receiver attachments respectively connected to said receivers for providing output signals indicative of the operating conditions of said receivers; a central office; signal link means interconnected between said receiver attachments and said central office; means at said central office responsive to said receiver operating condition signals from said receiver attachments for providing a record of the operating conditions of said receivers; and means for determining the number of operative receiver attachments in the system, said last-named means comprising a check-back means in said central office for supplying to said signal link means a check-back initiation signal to which said receiver attachments are responsive, said receiver attachments including means responsive to the reception of said check-back initiating signal for supplying to said signal link means test signals respectively corresponding to each of the monitored operating conditions of the associated receivers, and means in said central office responsive to said receiver operating condition test signals following said initiating signals for determining the operativeness of each of said receiver attachments.

5. A system for monitoring the use of a plurality of wave signal receivers, comprising a plurality of receiver attachments respectively connected to said receivers, said attachments providing output signals indicative of a plurality of operating conditions of the associated receivers, means remotely disposed from said attachments and responsive to said signals for recording information indicative of the operating conditions of said receivers, means for causing said receiver attachments periodically and simultaneously to provide output testing signals respectively corresponding to each of a plurality of operating conditions being monitored, a source of reference signals, means for comparing said testing signals to corresponding ones of said reference signals to determine if said testing signals are proper to indicate the operating conditons intended to be indicated thereby, and means for rendering said recorder means unresponsive to output signals from any of said attachments producing incorrect testing signals.

6. A system for monitoring the use of a plurality of wave signal receivers, comprising a plurality of receiver attachments respectively connected to said receivers for providing output signals indicative of a plurality of possible operating conditions of the associated receivers, means remotely disposed from said receiver attachments and responsive to said receiver operating condition signals for recording information indicative of the operating condition of said receivers, said receiver attachments periodically providing output testing signals respectively corresponding to each of a plurality of operating conditions in which the associated receivers may be operated, a source of reference signals, means for comparing said testing signals to said reference signals to determine if said testing signals are proper to indicate the operating conditions intended to be indicated thereby, and means for rendering said recorder means unresponsive to output signals from any of said attachments producing incorrect testing signals.

7. A system as set forth in claim 6 which further includes synchronizing means for causing all of said attachments to provide, during a predetermined period, only output testing signals indicating the same possible operating condition of the associated receivers, and said comparing means selectively compares the corresponding operating condition signals from all of said receiver attachments to a first reference signal, and thereafter selectively compares another operating condition signal from all of said receiver attachments to another reference signal.

8. A system as set forth in claim 6 wherein the operation of said receiver attachments to provide output testing signals is initiated at a location which is remote from said receiver attachments and which is connected thereto by a signal link.

9. In a monitoring system, a plurality of attachment means respectively connected to each of a plurality of receivers for developing voltage signals having characteristics respectively indicative of the operating conditions of the associated receivers, a central office, a signal link connecting said plurality of attachment means to said central office for transmitting said signals from said attachments to said central office, the characteristics from each of said attachments corresponding to each possible condition of operation of said receivers being the same, means at said central office for impressing a signal on said signal link for transmission to said attachments, and means in said plurality of attachment means responsive to said signal from said central office for initiating a control operation in which all of the attachments sequentially transmit signals of all of said characteristics.

10. A system for monitoring the use of a plurality of remotely located wave signal receivers, comprising a plurality of receiver attachments respectively connected to said receivers, a central office, signal link means connecting said office with said receiver attachments, means in each of said attachments for providing one signal representing the operative or inoperative condition of the receiver attachment and other signals indicative of the tuning condition of the associated receiver, means for impressing said signals on said signal link means for transmission to said central office, means at said central office responsive to said other signals for recording the tuning conditions of said receivers, and totalizer means in said central office responsive to said one signals received from said attachments via said signal link means for indicating at the central office the total number of operative attachments in the system and including the attachments connected to receivers that are in both "on" and "off" conditions.

11. In a wave signal receiver monitoring system, a plurality of receiver attachments for supplying signals representing the tuning conditions of a plurality of receivers, each of said receiver attachments providing different signals representing different tuning conditions of the receiver, a central office remote from said receiver attachments, signal link means connecting said receiver attachments to said central office, a common signal detecting means in said central office for providing an output signal corresponding to each of said different signals, means in said central office for rendering said common signal detecting means responsive in sequence to signals applied to said signal link means by different ones of said receiver attachments, said common detector means being operated to a setting corresponding to the one of the different signals received from the signal link means each time that the common detector means is rendered responsive to the signals from one of said receiver attachments, reset means for resetting the common detector means from an operated setting to a normal setting after the common detector means has received the signals from each receiver attachment, and a plurality of totalizing means connected to said common signal detecting means and operated by the output signals successively supplied by said common signal detecting means for determining the total number of receivers in each of said different tuning conditions.

12. In a wave signal receiver monitoring system, a plurality of receiver attachments each operable to transmit either data signals representing the tuning condition of the receiver or test signals representing the operative or inoperative condition of the attachment, a central office remote from said receiver attachments, signal link means connecting said central office and said receiver attachments, first control means in said central office for conditioning said central office to receive data signals from said attachments over said signal link means, second control means in said central office for conditioning said central office to receive test signals from said attachments over said signal link means, clock means, and means controlled by said clock means for selectively rendering said first and second control means effective.

13. In a wave signal receiver monitoring system, a plurality of receiver attachments for transmitting signals representing the tuning conditions of a plurality of receivers, a central office remote from said receiver attachments, signal link means connecting said central office to said receiver attachments, recording means in said central office controlled over said signal link means by said signals for recording said tuning conditions, test means in said central office operative over said signal link means to determine the operativeness of said receiver attachments, means controlled by said test means for operating said recording means to record data indicating the operative and inoperative conditions of said attachments, clock means, and means controlled by said clock means for rendering said recording means responsive to control by said signals representing tuning conditions at certain selected times and for placing said test means in operation at other selected times.

14. In a wave signal receiver monitoring system, a plurality of receiver attachments each connected to a wave signal receiver for supplying signals representing the tuning condition of the connected receiver, signaling means in each of said receiver attachments, test means in each of said receiver attachments for controlling the signaling means therein to transmit a signal of a predetermined characteristic when the attachment is in an operative condition and for controlling the signaling means to transmit a signal of a different characteristic when the attachment is not in an operative condition, said test means being operable independently of the operating condition of the connected receiver, a central office remote from said receiver attachments, signal link means connecting said central office to said receiver attachments, control means in said central office for controlling the test means in said plurality of attachments to cause the signaling means therein to transmit signals of said predetermined or different characteristics over said signal link means in accordance with the operative or inoperative conditions of the attachments, detecting means in said central office for separating the signals of said predetermined and different characteristics, and output means controlled by said detecting means for indicating the operative or inoperative condition of the attachments.

15. In a wave signal monitoring system, a plurality of receiver attachments each connected to a wave signal receiver, each of said attachments including signaling means controlled independently of the operating condition of the connected wave signal receiver for transmitting a signal indicating that the attachment is in an operative condition, each of said attachments including a receiver means responsive to a received signal for placing said signaling means in operation, a central office remote from said attachments, signal link means connecting said central office to said attachments, means in said central office for transmitting signals over said signal link means to the receiver means in said attachments, said receiver means being operated by the signals transmitted over said signal link means to place said signaling means in operation, said signaling means then transmitting predetermined signals over said signal link means to said central office if said attachments are in an operative condition, and means in said central office energized by the predetermined signals received from said signal link means for producing an indication of the ones of said attachments that are in an operative condition and the ones of said attachments that are in an inoperative condition.

16. In a wave signal receiver monitoring system, a plurality of receiver attachments for supplying signals representing the operating conditions of receivers in the system, a central office remote from said receiver attachments, signal link means connecting said central office to said receiver attachments, recording means, means in said central office controlled by signals received from said attachments over said signal link means for operating said recording means to record the operating conditions of said wave signal receivers, test means in said central office operative over said signal link means to determine the operative condition of said attachments, and means controlled by said test means for preventing operation of said recording means by signals from inoperative attachments.

17. A system for monitoring the use of a plurality of wave signal receivers comprising means for establishing a plurality of signals indicative of the operating conditions of said receivers, classifying means responsive to predetermined characteristics of said signals for classifying said signals into groups according to the operating conditions represented by said signals, recording means for recording the number of signals in each of said groups, first and second control means connected between said recording means and said classifying means for controlling said recording means to record the number of signals in each of said groups, and timing means connected to said first and second control means for rendering said first and second control means effective to control the operation of said recording means during two dissimilar and overlapping time periods.

18. The system set forth in claim 17 including means controlled by said timing means for controlling said recording means to record the times at which the numbers of signals in said groups are recorded.

19. A system for monitoring the use of a plurality of wave signal receivers comprising receiver attachment means respectively connected to said receivers for developing respective voltages having different values corresponding to the different operating conditions of the associated receivers; a central office remotely disposed with respect to said receiver attachments; telephone wire facilities connecting said voltages to said central office; and classifying and counting means at said central office selectively responsive to said voltages for providing a record of the number of said receivers which were operated in each of the plurality of possible operating conditions during a predetermined time interval, said classifying and counting means comprising a plurality of differently biased controlled conduction devices, means for applying said different value voltages to said differently biased controlled conduction devices to render different combinations of said devices conductive or nonconductive in accordance with the value of the applied voltages, and counting means each controlled by the operation of said controlled conduction devices to one of said combinations of conductive and nonconductive conditions.

References Cited in the file of this patent

UNITED STATES PATENTS

| | | |
|---|---|---|
| 2,366,913 | Le Clair | Jan. 9, 1945 |
| 2,432,944 | Shillington | Dec. 16, 1947 |
| 2,434,946 | McKim | Jan. 27, 1948 |
| 2,439,201 | Clark | Apr. 6, 1948 |
| 2,576,892 | Stanton | Nov. 27, 1951 |
| 2,630,366 | Rahmel | Mar. 3, 1953 |
| 2,674,512 | Hogert et al. | Apr. 6, 1954 |
| 2,678,382 | Horn et al. | May 11, 1954 |
| 2,716,702 | Reynolds | Aug. 30, 1955 |
| 2,833,859 | Rahmel et al. | May 6, 1958 |